(12) United States Patent
Joye et al.

(10) Patent No.: US 10,340,738 B2
(45) Date of Patent: Jul. 2, 2019

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Klaas Jacob Lulofs, Eindhoven (NL); Andries Van Wageningen, Wijlre (NL); Wilhelmus Gerardus Maria Ettes, Leeuwarden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 109 days.

(21) Appl. No.: 15/316,563

(22) PCT Filed: Jun. 17, 2015

(86) PCT No.: PCT/EP2015/063587
§ 371 (c)(1),
(2) Date: Dec. 6, 2016

(87) PCT Pub. No.: WO2015/197443
PCT Pub. Date: Dec. 30, 2015

(65) Prior Publication Data
US 2017/0149286 A1 May 25, 2017

(30) Foreign Application Priority Data
Jun. 25, 2014 (EP) .................................... 14173876

(51) Int. Cl.
*H02J 7/00* (2006.01)
*H02J 50/12* (2016.01)
(Continued)

(52) U.S. Cl.
CPC .............. *H02J 50/12* (2016.02); *H02J 7/025* (2013.01); *H02J 7/027* (2013.01); *H02J 7/045* (2013.01);
(Continued)

(58) Field of Classification Search
USPC ................ 320/108, 107, 104, 162, 134, 132
See application file for complete search history.

(56) References Cited

U.S. PATENT DOCUMENTS

| 2011/0115303 A1 | 5/2011 | Baarman et al. |
| 2012/0201054 A1 | 8/2012 | Kitamura et al. |

(Continued)

FOREIGN PATENT DOCUMENTS

| DE | 102006022222 A1 | 11/2007 |
| EP | 2587653 A2 | 5/2013 |

(Continued)

OTHER PUBLICATIONS

"Cordless Kitchen Appliances a Powerful New Kitchen Concept", Wireless Power Consortium, Apr. 2013, pp. 1-8.

*Primary Examiner* — Alexis B Pacheco

(57) ABSTRACT

A power transmitter (2) for transferring power to a power receiver comprises a first inductor (307) for providing power and a second inductor (407) for receiving data signals from a power receiver. The first (307) and second (407) inductors are separate inductors in a power transfer circuit (701) and a data signal receiving circuit (702). The data signal receiving circuit (702) comprises a data extracting circuit (1007) for extracting the data signals received by the second inductor (407). The power transmitter comprises a control circuit (401) for controlling the power in dependence on the data signals. The power transmitter transfers power during power transfer periods and receives data during communication periods, communication periods corresponding to periods wherein power is low. The control circuit (401) electrically couples the data extraction circuit (1007) and the second inductor (407) from each other during communication periods and electrical decouples them during at least a part of power transfer periods.

18 Claims, 20 Drawing Sheets

(51) Int. Cl.
  *H04B 5/00* (2006.01)
  *H02J 50/80* (2016.01)
  *H02J 7/02* (2016.01)
  *H02J 7/04* (2006.01)
  *H02J 7/34* (2006.01)

(52) U.S. Cl.
  CPC ............ *H02J 50/80* (2016.02); *H04B 5/0031* (2013.01); *H04B 5/0037* (2013.01); *H04B 5/0087* (2013.01); *H02J 7/345* (2013.01)

(56) References Cited

U.S. PATENT DOCUMENTS

| | | |
|---|---|---|
| 2012/0314745 A1 | 12/2012 | Tsai et al. |
| 2014/0152120 A1 | 6/2014 | Urata et al. |

FOREIGN PATENT DOCUMENTS

| | | |
|---|---|---|
| JP | 2011062008 A | 3/2011 |
| JP | 2013128385 A | 6/2013 |
| WO | 2014108785 A1 | 7/2014 |
| WO | 2015007518 A1 | 1/2015 |

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2015/063587, filed on Jun. 17, 2015, which claims the benefit of European Patent Application No. EP14173876.5, filed on Jun. 25, 2014. These applications are hereby incorporated by reference herein.

FIELD OF THE INVENTION

The invention relates to inductive power transfer and in particular, but not exclusively, to an inductive power transfer system in accordance with the Qi wireless power transfer standard and a power transmitter.

BACKGROUND OF THE INVENTION

Many systems require a wiring and/or electrical contacts in order to supply electrical power to devices. Omitting these wires and contacts provides for an improved user experience. Traditionally, this has been achieved using batteries located in the devices but this approach has a number of disadvantages including extra weight, bulk and the need to frequently replace or recharge the batteries. Recently, the approach of using wireless inductive power transfer has received increasing interest.

Part of this increased interest is due to the number and variety of portable and mobile devices having exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

As mentioned, most present day devices require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each power supply being dedicated to a specific device. Although, internal batteries may prevent the need for a wired connection to an external power supply, this approach only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers which have a tight coupling between the primary transmitter coil and the secondary receiver coil. By separating the primary transmitter coil and the secondary receiver coil between two devices, wireless power transfer between the devices becomes possible based on the principle of a loosely coupled transformer.

Such an arrangement allows a wireless power transfer to the device without requiring any wires or physical electrical connections. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website:
http://www.wirelesspowerconsortium.com/index.html,
where in particular the defined Standards documents can be found.

As an example, FIG. 1 illustrates a part of a power transfer system integrated in a table top and FIG. 2 illustrates a power transfer system with various to be powered appliances.

Inductive power sources for a system according to the invention may be stand alone or integrated in kitchen counter tops to power cordless appliances. FIG. 1 illustrates a system wherein, in a table top 1, a power transmitter 2 provided with a power cord 3 is placed in a hollow 4 in a table top. Integration of power transmitters is not limited to counter tops and induction cooktops. They may also be integrated into kitchen or dining tables, thus enabling completely new functions that were not possible before. Examples are keeping food or drinks warm, toasting bread, making coffee or cooling wine. It will also enable a whole range of table top cooking possibilities at home or in restaurants. FIG. 2 illustrates a system wherein underneath a surface 1 a power transmitter 2 is positioned. Various appliances 5 such as a toaster, a pan and a steel pan may be powered by the power transmitter 2.

In order to support the interworking and interoperability of power transmitters and power receivers, it is preferable that these devices can communicate with each other, i.e. it is desirable if communication between the power transmitter and power receiver is supported, and preferably if communication is supported in both directions. An example of a wireless power transfer system allowing communication between a power receiver and a power transmitter is provided in US2012/314745A1.

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

In the QI wireless power specification for low power, the receiver communicates with the transmitter by modulating the amplitude of the power signal. In this case, the power signal is used as the carrier signal for the communication signal.

However, a limitation of the Qi system is that it does not support communication from the power transmitter to the power receiver. Furthermore, load modulation such as developed for Qi may be suboptimal in some applications.

As an example, FIG. 3 illustrates a power supply path for typical induction heating appliance. The power provision comprises an AC/DC converter 301 which rectifies the input ac voltage (e.g. the mains). The rectified mains signal is fed to a DC/AC converter 303 (Inverter) which generates a high frequency drive signal which is fed to a resonant tank 305 (a tuned L-C circuit) and via this to a transmitter coil 307. The system includes a power receiver, in this example a heating pan, which can be represented by a receiver coil 309 and a load R_Sole 311 (representing the Eddy current losses in the pan sole).

FIG. 4 illustrates the voltage waveforms of the power path of FIG. 3. The mains voltage Umains is rectified by the AC/DC converter 301 to the voltage Udc_abs. A large storage capacitor, which is used to buffer the rectified mains voltage, is normally not applied in these kinds of applications since it will add to the total mains harmonic distortion of this application. As a result, a varying DC voltage is generated by the AC/DC converter 301.

Because of the characteristics of the rectified voltage Udc_abs, the output voltage Uac_HF of the DC/AC converter 303 is shaped as shown in FIG. 4. The normal operating frequency of the inverter is in the order of 20 kHz to 100 kHz.

The transmitter coil 307, together with the receiver coil 309 and resistance R_sole, is basically the load of the DC/AC converter 303. However, due to the nature of this load (both inductive and resistive) a resonant circuit 305 is typically used in between the DC/AC converter 303 and this load in order to cancel the inductive part of the load. Furthermore, the resonant network 305 typically results in a reduction in the switching losses of the inverter typically used in the DC/AC converter 303.

Communication between receiver and transmitter in a system such as FIG. 2 is faced with multiple challenges and difficulties. In particular, there is typically a conflict between the requirements and characteristics of the power signal and the desires for the communication. Typically, the system requires close interaction between the power transfer and communication functions. For example, the system is designed based on the concept of only one signal being inductively coupled between the transmitter and the power receiver, namely the power signal itself. However, using the power signal itself for not only performing a power transfer but also for carrying information results in difficulties due to the varying nature of the power signal amplitude. For example, in order to modulate a signal on to the power signal, or to use load modulation, the power signal must have sufficient amplitude. However, this cannot be guaranteed for a power signal such as that of FIG. 4.

As a specific example, using a load modulation approach wherein the power receiver communicates data by load modulation (such as in the Qi system) requires that the normal load is relatively constant. However, this cannot be guaranteed in many applications.

E.g., if wireless power transfer is to be used to power a motor driven appliance (such as e.g. a blender), a power path similar to that of FIG. 3 can be used but with the load (corresponding to the heating pan) being replaced by a separate receive inductor 313 (Rx coil), an AC/DC converter 315 and the DC motor 317 itself. Such a power path is illustrated in FIG. 5.

The typical voltage and current waveforms of such a wireless motor driven appliance are shown in FIG. 6. As illustrated, the motor current, Idc_motor, tends to be quite erratic and discontinuous. Near the zero crossings of the mains voltage, gaps appear in the motor current. This is caused by the rotation voltage of the motor. The DC/AC converter (Inverter) is only able to supply current to the motor if the voltage Uac_Rx is higher than the rotation voltage Udc_mot induced in the motor.

To control the speed (or torque) of the motor, a speed sensor (or current sensor) may be added to the system, together with a feedback loop from the speed sensor to the power transmitter. Because of the nature of the inverter (which could be a voltage or current source), the DC/AC converter (Inverter) is preferably incorporated in this feedback loop. Therefore communication is required between the appliance part (the power receiver) and the power transmitter part. This may be achieved by applying load modulation techniques at the appliance side, such that the load changes can be detected and demodulated at the transmitter side. This demodulated data can then include information of the motor speed (or torque), or indeed any other information that may e.g. be used to control the transmitter.

However, when a motor driven appliance draws current, the amplitude of this current is strongly related to the load of the motor. If the motor load is changing, the motor current is changing as well. This results in the amplitude of the inverter current also changing with the load. This load variation will interfere with the load modulation, resulting in degraded communication. Indeed, in practice it is typically very difficult to detect load modulation for loads that include a motor as part of the load. Therefore, in such scenarios, the number of communication errors is relatively high or the communication may utilize very high data symbol energy, thereby reducing the possible data rate very substantially.

For kitchen appliances, this communication method suffers from the following properties:

The power signal, which is typically in the range of a few tens of kHz to approximately 100 kHz, is not constant. Furthermore, its amplitude varies with the mains frequency (e.g. 50, or 60 Hz), because the DC/AC converter present in the power transmitter is fed with a rectified sine wave.

During the zero crossings of the rectified sine wave, the inverter current is zero, so there is no carrier available for amplitude modulation.

The load of the appliance varies, which will interfere with the amplitude modulation.

One possible solution is to use other communication means such as such as RFID, NFC, Bluetooth or ZigBee.

One other possible solution is to generate a separate carrier signal on the transmitter or receiver side. The time period during which the inverter is disabled, which is near the zero crossings of the mains voltage, is used for communication purposes. Thus, communication between the receiver and the transmitter is not influenced by the power signal or by the load variations.

For all possible solutions it holds that safety is of prime concern. One aspect of safety is that the communication should be safe. Various apparatuses, such as a blender, coffee machine etc. could be used as power receivers and a kitchen could have more than one power transmitter. A power transmitter reacting to a communication signal of a power receiver that is not actually situated on the power transmitter but somewhere else in the kitchen poses a serious safety problem. Therefore a very close relationship, preferably one-to-one relationship between the communication and power channels is preferred. Furthermore the power transmitter as well as the power receiver preferably is of compact design. Furthermore the communication system should preferably be robust and sensitive.

Furthermore, in order to provide efficient communication, it is desired that the overhead associated with communication (such as e.g. power transfer interruptions or degradations caused by the desired to communicate) are reduced as much as possible.

Hence, an improved power transfer system would be advantageous and in particular a system allowing improved communication support, increased reliability, increased flexibility, facilitated implementation, reduced sensitivity to load variations and/or improved performance would be advantageous.

SUMMARY OF THE INVENTION

Accordingly, the invention seeks to preferably mitigate, alleviate or eliminate one or more of the above mentioned disadvantages singly or in any combination.

According to a first aspect of the invention, there is provided power transmitter for transferring power to a power receiver using an inductive power signal, wherein the power transmitter comprises: a first inductor for providing via the first inductor an inductive power signal to the power receiver; a second inductor for receiving data signals from the power receiver, a capacitor in a series coupling with the second inductor; wherein the first and second inductors are separate inductors in a power transfer circuit and a data signal receiving circuit, wherein the data signal receiving circuit comprises a data extracting circuit for extracting the data signals received by the second inductor and a driver for generating a drive signal for the series coupling of the second inductor and the capacitor during a drive time interval including the communication period, the power transmitter comprising a control unit for controlling the power signal supplied via the first inductor to the power receiver in dependence on the data signals received and the power transmitter is arranged to transfer power via the first inductor during power transfer periods of a repeating time frame and receive data signal via the second inductor during communication periods of a repeating time frame, a power of the inductive power signal being reduced for the communication period relative to the power transfer period, wherein a control circuit is arranged for application of a controlled electrical coupling of the data extraction circuit to the second inductor during a communication period and electrical decoupling of the data extraction circuit from the second inductor during at least a part of power transfer periods; and the data signal receiving circuit further comprises a discharge circuit for discharging the capacitor during a discharge time interval of the time frame at least partially preceding the communication period.

The invention may provide improved operation in many embodiments and may in particular provide facilitated and/or improved communication and/or power transfer. In many scenarios, the approach may provide improved reliability and may reduce the risk of e.g. component damage.

The approach further comprises functionality for discharging a capacitor coupled in series with the first inductor prior to the communication period. This may reduce the risk of damage to e.g. components of the power transmitter. Further, it may allow more efficient operation and e.g. reduce the delay or wait time before communication can be performed. For example, it may allow a faster driving of the second inductor in order to generate a carrier which e.g. can be load modulated.

The first and second inductors are separate inductors. This allows the power transmission channel, for providing power from the power transmitter to the power receiver, and the communication channel, for providing data from the power receiver to the power transmitter, to be substantially electrically separate circuits. These separate channels are here called "power transfer circuit" and "data receiving circuit". This approach provides the advantage that the two channels, power and communication channels can be optimized independently. For example, the transmit power coil and its resonance circuitry are designed for an optimum power transfer performance. E.g., they are not optimized for the communication signal, which is typically expected to have a larger frequency (100 kHz . . . 20 MHZ) than the power signal frequency (typically in the range of 20-100 kHz). The present approach instead provides separate communication coils. The power transmitter comprises in the data receiving circuit a data extraction circuit, for instance a demodulation circuit, for extracting the data signals from the second inductor and a control unit for controlling the power supplied via the first inductor to a power receiver in dependence on the extracted data signals. The received data signal sent by a power receiver is used to control the power signal and thereby the power to be supplied to said power receiver.

The time frame may be a periodically repeating power transfer signal time frame and may have a repetition frequency of no less than 5 Hz and no more than 200 Hz. The capacitor and second inductor may form a resonance circuit.

The power transmitter is arranged to transfer power via the first inductor during power periods and receive a signal via the second inductor during communication periods. These periods may at least partially overlap but preferably do not overlap. Thus, a repeating time frame comprising at least a communication and a power transfer period is provided. The power of the inductive power signal is reduced during the communication period compared to the power transfer period. In many embodiments, the maximum power level of the communication period is lower than the minimum power level of the power transfer period. In many embodiments, the average power level during the power transfer period is at least twice, and often at least five times, the average power level during the communication period.

The communication period may thus correspond to periods wherein the power source signal is low, low meaning low with respect to the average power signal. The communication signal is received during periods when the power signal level is relatively low. At such periods, the power signal will often have a negligible (or little) influence on the communication signal. This increases the efficiency of the data signal transfer. The data signals are sent at a period when the power signal is low. The power signal itself then has a negligible influence on the data signal.

However, for a compact design and to reduce as much as possible the possibility that signals from power receivers other than the one driven are used, the communication and power channels preferably have a very close relationship, often almost a one-to-one relationship, e.g. the communication coils share the same magnetic plane as the power coils (e.g. the transmit communication coil and the transmit power coil must be in the same magnetic plane, and the receive communication coil and the receive power coil must be in the same magnetic plane). Thus, the magnetic coupling between the transmit power inductor (usually in the form of a coil) and the transmit communication inductor can have a relatively large value.

A coupling factor of 0.3 to 0.5 can typically be expected. In such circumstances, although the power signal is expected to have a negligible (or little) influence on the communication signal during the communication periods around the zero crossings of the power signal (since the amplitude of the power signal is either very small or null during the transmission periods), a large voltage across the transmit communication coil may often be generated during the power transfer periods. Depending on the inductance values of the communication coil, the voltage across it could reach several hundred volts. Although the voltage across the communication coil could be reduced by decreasing the inductance value of the coil, the voltage across it could still reach 100 V or higher even with a coil having 1 or 2 winding. For example, with an inductance value of 3 µH, corresponding to a 21.4 cm coil having 2 windings, the voltage across it still reaches 120 V.

The large voltage (and current) levels generated across the transmit communication coil could potentially damage and even permanently destroy the communication electronics, in particular the demodulation circuitry. This could lead to severe safety issues. A simple solution is to implement electronic components which withstand these large voltages. However, this approach is unwanted since the cost, size, complexity, etc. of the electronics will increase to unacceptable levels.

The described approach allows a simple solution in that the control circuit is arranged for application of a controlled electrical an electrical coupling of the data extracting circuit to the second inductor during a communication period and electrical decoupling of the data extraction circuit from the second inductor during at least part of power transfer periods.

Decoupling occurring outside the communication period limits the current flowing in the communication circuitry.

Since the voltage across the transmit communication coil, the second inductor, can in many embodiments reach several hundred volts during power transfer periods, the current flowing through the communication circuitry could reach very large values, typically a few amperes. A controllable decoupler is implemented, for instance a switch in series with the transmit communication coil. This switch is controllable opened when the voltage across the communication coil generates a current which could damage the data extraction circuitry (i.e. during at least part of the power transfer periods). A control circuit opens the switch for a controllable decoupling of the data extraction circuit from the second inductor. Various ways of controlling are for instance:

timing with respect to the power signal and/or measuring the current through the circuitry and opening or closing the switch below or above a certain threshold value.

During the communication periods the second inductor is electrically coupled to the data extraction circuit, for picking up the data signals.

Optionally the power transmitter comprises a resistance and a controllable switch for coupling or decoupling the resistance from the data receiving circuit for reducing the maximum current through the data extraction circuit.

Since a large current flowing through the communication coil can still occur when the switch is closed, a damping resistance (typically around 100 Ohm) may be provided, e.g. one in series with the switch. This resistance will limit the current flowing through the data extraction circuitry, thereby reducing the maximum current through the data extraction circuit.

Said damping resistance may be decoupled from the data receiving circuit during at least the major part of the communication period. The function of the damping resistance is to limit the current flowing through the extraction circuitry to prevent or avoid possible damage to the data extraction circuit due to too high current flowing through the data extraction circuit. Limiting the current through the data extraction circuit reduces however the sensitivity. By decoupling the damping resistance during at least a major part of the communication period a safety measure is provided (reducing the maximum current through the data extraction circuit outside the communication period) without or at least without much reducing the sensitivity or efficiency of the data transfer, since during at least a part of the communication period the damping resistance is decoupled, thus not having little if any effect during the communication periods.

According to another aspect of the invention, there is provided a power transfer system comprising a power transmitter as described above.

According to another aspect of the invention, there is provided a method of operation for a transferring power to a power receiver using an inductive power signal, the power transmitter comprising: a first inductor for providing via the first inductor an inductive power signal to the power receiver; a second inductor for receiving data signals from the power receiver, a capacitor in a series coupling with the second inductor; wherein the first and second inductors are separate inductors in a power transfer circuit and a data signal receiving circuit, the method comprising: a data extracting circuit of the data signal receiving circuit extracting the data signals received by the second inductor; a driver generating a drive signal for the series coupling of the second inductor and the capacitor during a drive time interval including the communication period; a control unit controlling the power signal supplied via the first inductor to the power receiver in dependence on the data signals received; and transferring power via the first inductor during power transfer periods of a repeating time frame and receive data signal via the second inductor during communication periods of a repeating time frame, a power of the inductive power signal being reduced for the communication period relative to the power transfer period; applying a controlled electrical coupling of the data extraction circuit to the second inductor during a communication period and electrical decoupling of the data extraction circuit from the second inductor during at least a part of power transfer periods; and a discharge circuit of the data signal receiving circuit discharging the capacitor during a discharge time interval of the time frame at least partially preceding the communication period.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

In the following, some embodiments will be described wherein the power channel and the data channel are separate electrical circuits.

Figure 7:
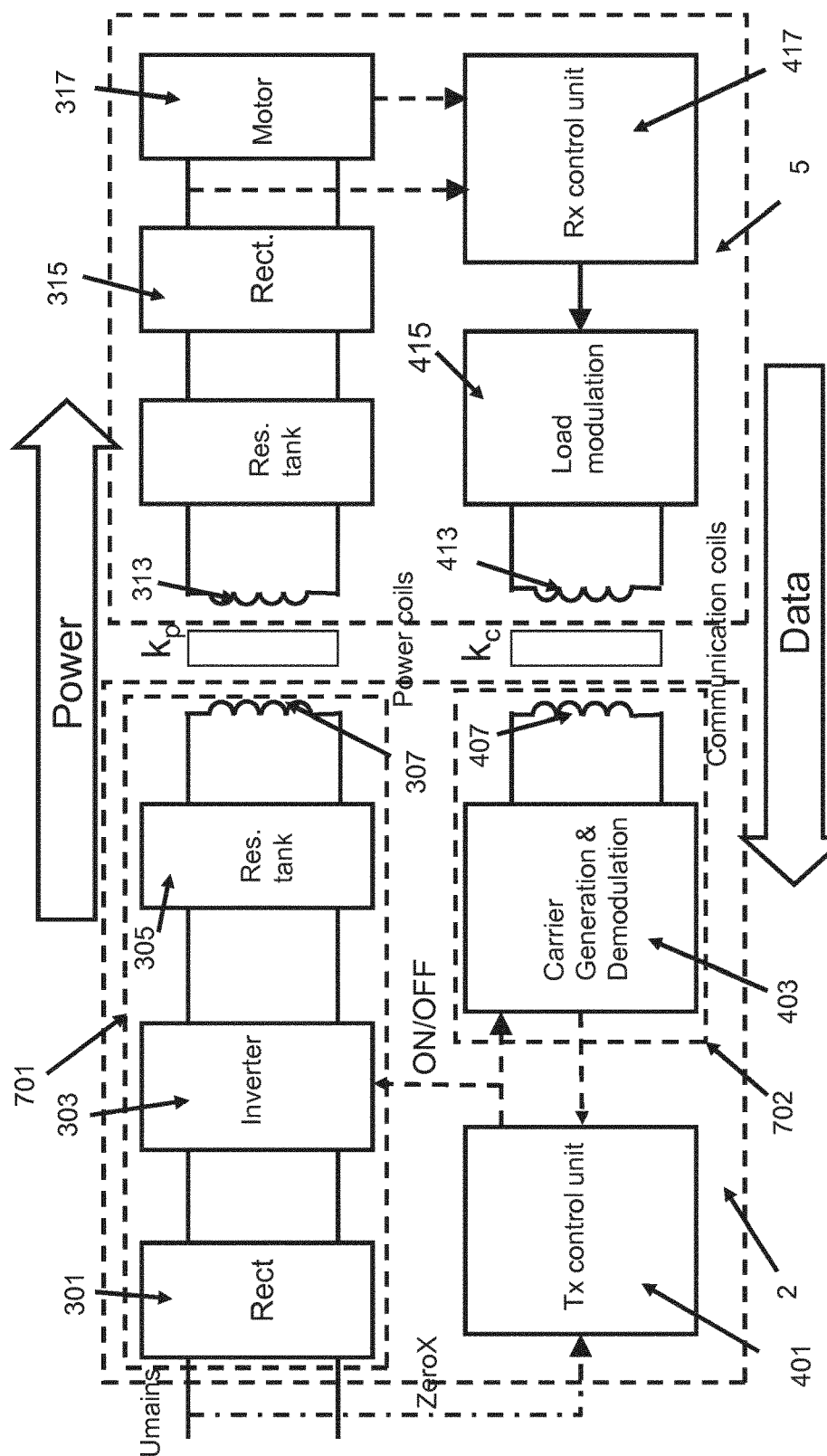
FIG. 7 illustrates an example of a power transfer system comprising a power transmitter and a power receiver in accordance with some embodiments of the invention.

An example of a power transfer system comprising a power transmitter and a power receiver in accordance with some embodiments of the invention is shown in FIG. 7. In the example, the first 307 and second inductors 407, i.e. respectively a power transfer inductor and a communication inductor also referred to as a power transfer coil 307 and a communication coil 407, of the power transmitter are separate inductors. This allows a power transmission channel, for providing power from the power transmitter to the power receiver, illustrated in FIG. 7 by the arrow going from the power transmitter 2 to the power receiver 5, and a communication channel, for providing data from the power receiver to the power transmitter, illustrated by the arrow going from the power receiver 5 to the power transmitter 2, to be substantially electrically separate circuits. The power transmitter comprises a power transfer circuit 701, comprising at least the parts 301, 303, 305 and 307, and data signal receiving circuit 702 comprising at least elements 403 and 407. Control circuit 417 in power receiver 5 provides data signals that are sent via the inductor 413 to the data signal receiving circuit 702 during a communication period when the power of the power signal is reduced. Indeed, in the system, during power transfer, the system adopts a repeating time frame which comprises at least a power transfer period (or interval/time slot) and a communication period (or interval/time slot). The power level of the inductive power signal is reduced during the communication period relative to the power transfer period. In most embodiments, the power level of the inductive power signal is during the communication period sufficiently low for the power signal itself to have a negligible influence on the data signal sent to the power transmitter 2. This approach provides the advantage that the two channels (the power and the communication channel) can be optimized independently, and that the two circuits 701 and 702 can be substantially individually optimized for their function. For example, the transmit power coil and its resonance circuitry can be designed for an optimum power transfer performance whereas the communication coil and indeed resonance circuit can be optimized for communication.

FIG. 7 shows schematically the power transmitter 2 having a Tx control circuit 401 which is arranged to retrieve the data from the carrier generation and demodulation circuit 403 (which also comprises a part to distinguish the data received from the power receiver 5). The Tx control circuit 401 uses the signals to control the power channel. For instance the amount of power is dependent on the type of device and/or the load required to drive the device, and feedback on this can be provided by data sent from the power receiver 5 to the power transmitter 2 via the communication channel. In FIG. 7 the indication $k_p$ and $k_c$ stand for the coupling coefficients between inductors 307 and 313, respectively 407 and 413. The reference "ZeroX" refers to zero crossing and indicates timing information provided or retrieved to indicate when the input signal $U_{mains}$ has a zero crossing. This indicates that the Tx control unit 401 receives information about the occurrence of a zero crossing in the input power source signal Umains. It can then accordingly control the power inverter (303) and the carrier generation & demodulation (403) circuits in response to the timings of these zero crossings.

In the embodiment, the timing of the zero crossings are used to generate a time frame which comprises communication periods/intervals/time slots and power transfer periods/intervals/time slots. The communication periods are positioned around the zero crossings and are time periods in which communication may occur, in particular where the power receiver 5 may communicate by load modulation. Due to the timing of the communication periods around the power level of the power transfer signal, the power level of the power transfer signal is lower during the communication periods than during the power transfer periods. Indeed, in some embodiments, the power transfer circuit 701 may be arranged to switch off the power signal (i.e. the drive signal for the power transfer coil 307).

Thus, a periodically and repeating power transfer time frame is adopted which comprises (at least) two different time intervals, namely a power transfer period and a communication period, where the power level is reduced in the communication period. Thus, the transfer of power is predominantly performed in the power transfer period whereas the communication period is used for communication of data.

In more detail, the rectifier 301 receives a power source signal $U_{mains}$ and rectifies this. The rectifier 301 may thus be an AC to DC converter which receives an AC signal and generates a DC signal with a varying level.

Figure 4:
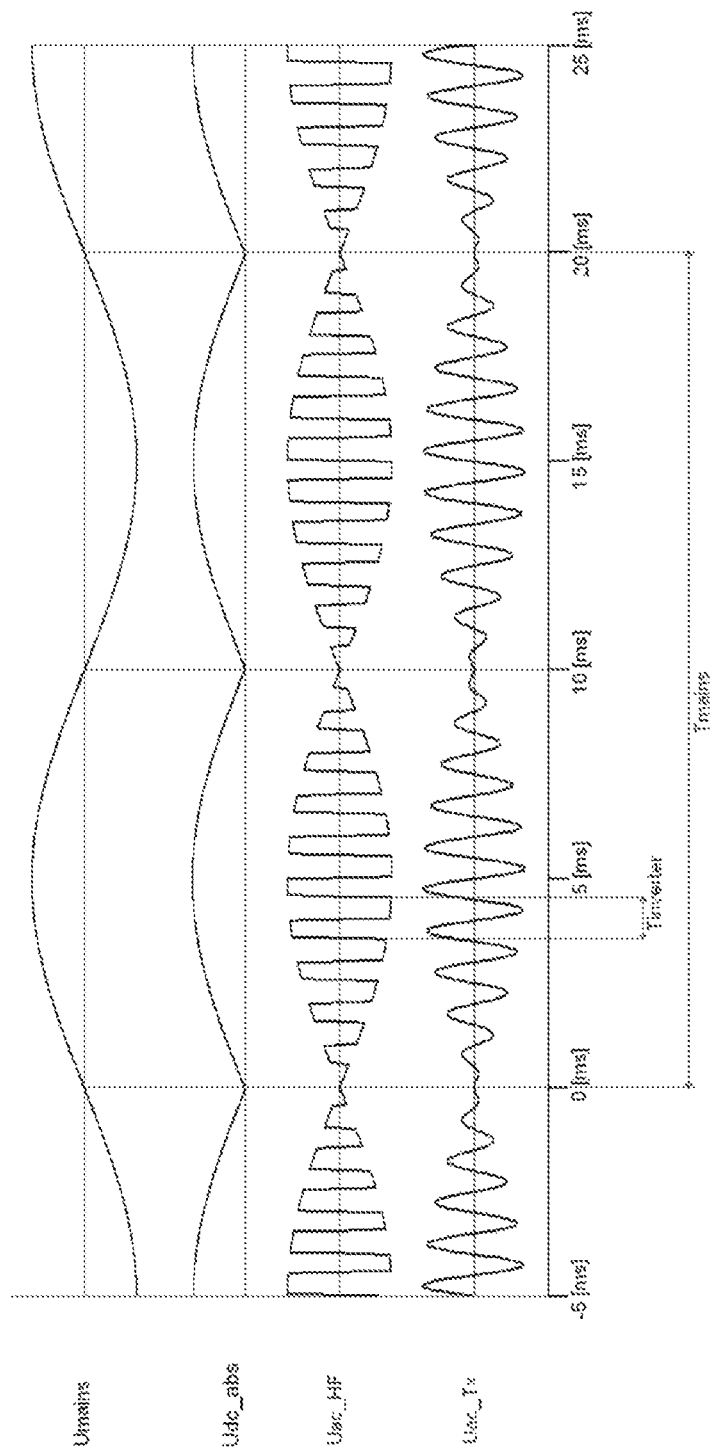
FIG. 4 illustrates an example of some signals of a power transfer system.
Figure 5:
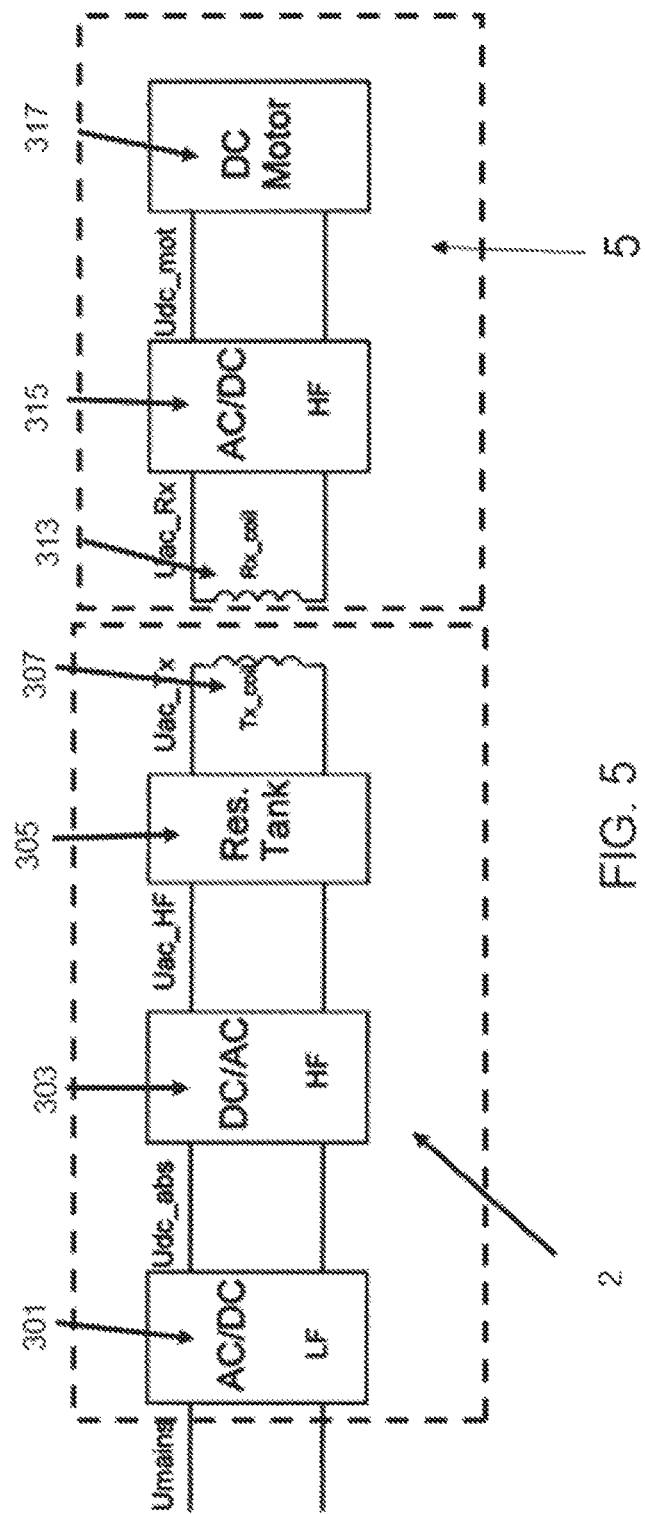
FIG. 5 illustrates an example of a power transfer system comprising a power transmitter and a power receiver.
Figure 6:
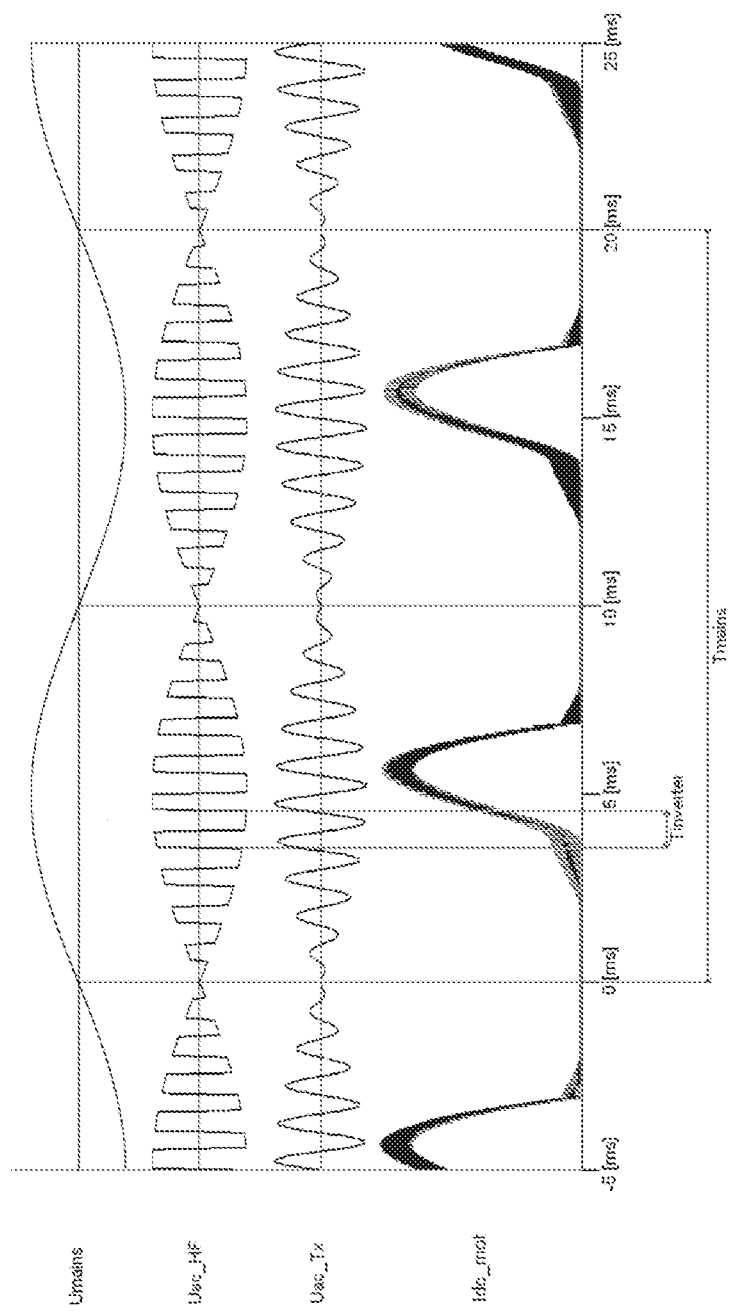
FIG. 6 illustrates an example of some signals of a power transfer system.

In the specific example, the power source receives a mains derived sine wave signal with a frequency of 50 Hz or 60 Hz. The rectifier 301 performs a full wave rectification of the sine wave signal. Thus, a power source signal corresponding to the Udc_abs signal of FIG. 4 is generated.

The frequency of the periodic variations in the power source signal is typically derived from the frequency of a mains signal, and thus is typically corresponding to 50 or 60 Hz (or the first harmonic thereof, i.e. 100 Hz or 120 Hz). However, in other embodiments, the variations may be up to 1 kHz.

In the example, the rectifier 301 does not include any smoothing capacitor and thus the power source signal corresponds to a full wave rectified sine wave signal. However, in other embodiments, the rectifier 301 may comprise a capacitor which smoothes the rectified signal thereby generating a power source signal with less level variation. However, in most embodiments the capacitor may be relatively small resulting in a power source signal with a level that varies substantially, at least for some loads. E.g. in many scenarios, the ripple may be at least 25% or 50% of the full load.

Thus, a DC power source signal is generated which has a varying voltage. The varying voltage is due to the variations of the AC level and thus the DC power source signal is a periodic signal with a period of twice the frequency of the mains, i.e. with a period of 10 msec for a 50 Hz input signal or 8.3 msec for a 60 Hz input signal.

The rectifier 301 is coupled to a power signal generator 303 which receives the power source signal and which from this generates a drive signal for the power transfer coil 307 which is coupled to the power signal generator 303 via the resonance tank 305.

The frequency of the amplitude variations will typically follow the variations in the power source signal. In general, the frequency is maintained relatively low and does not exceed 1 kHz. However, whereas the amplitude varies with such a relatively low frequency, the frequency of the drive signal itself is relatively high.

The power signal generator 303 may specifically comprise a frequency converter arranged to generate the frequency of the drive signal to be higher than the frequency of the power signal. The frequency converter may increase a frequency of the drive signal relative to the power signal. The power transfer coil 307 is driven by a drive signal which has a substantially higher frequency than the frequency of the power source signal. The period of the power source signal is typically no less than 2.5 msec or even 5 msec (corresponding to a frequency of 400 Hz or 200 Hz respectively). However, the drive signal typically has a frequency of at least 20 kHz to 200 kHz. During power transfer periods, i.e. the intervals between the communication periods, the drive signal may specifically be given as:

$$d(t)=p(t)\cdot x(t)$$

where p(t) is the power source signal and x(t) is a signal with a higher frequency than p(t), and typically with a much higher frequency (e.g. typically 100 times higher or more). In order to reduce losses, x(t) is typically an AC signal, i.e. it has an average value of zero.

x(t) may for example be a sine wave. However, in the example of FIG. 4, x(t) corresponds to a square wave signal. The frequency conversion is in the example performed by a switching operation rather than by a multiplication. Specifically, the frequency converter comprises a switch circuit to which the power source signal is provided as a supply voltage and which couples to the power transfer coil 307-tank circuit 305 via switch elements that provide an effect corresponding to the multiplication of the power source signal and a frequency conversion signal x(t).

Figure 8:
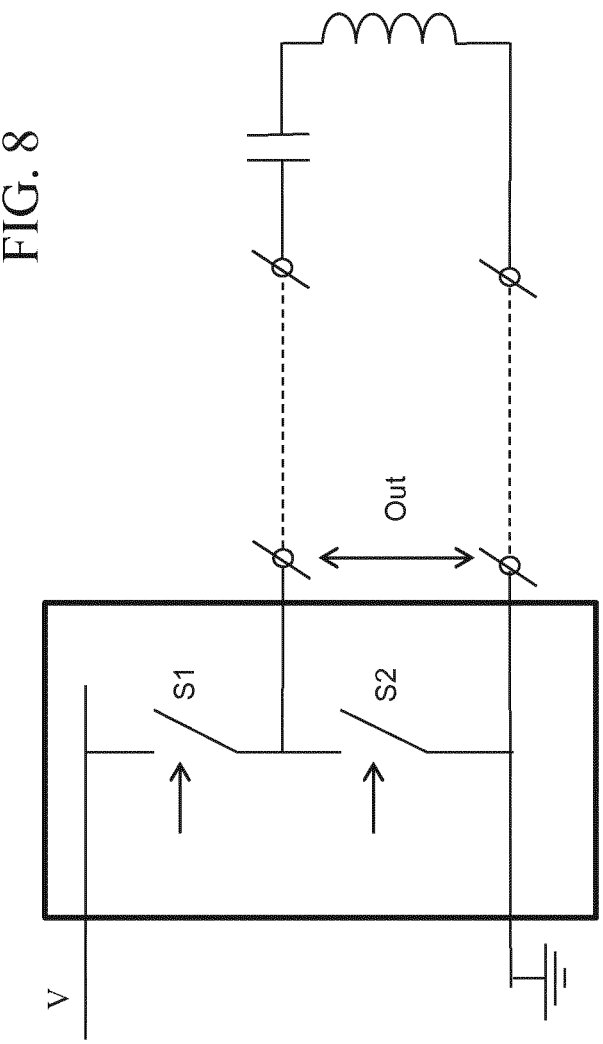
FIG. 8 illustrates an example of an inverter drive circuit.
Figure 9:
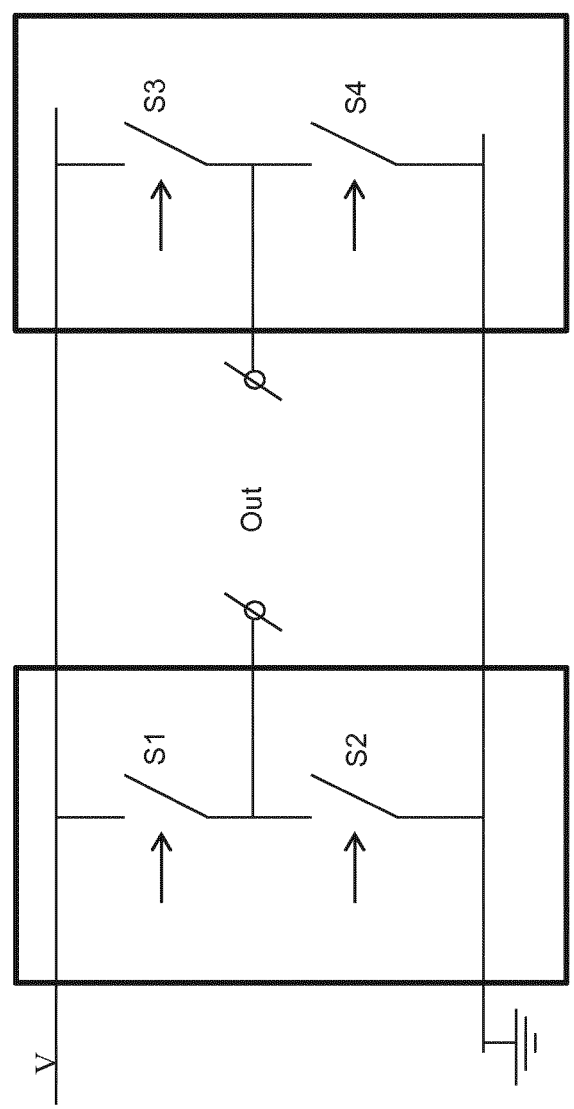
FIG. 9 illustrates an example of an inverter drive circuit.

In the system of FIG. 7, the frequency converter includes a drive circuit in the form of an inverter which generates an alternating signal from the varying DC Voltage of the power source signal being used as a supply voltage. FIG. 8 shows an example of a half-bridge inverter. The switches S1 and S2 are controlled such that they are never closed at the same time. Alternatingly S1 is closed while S2 is open, and S2 is closed while S1 is open. The switches are opened and closed with the desired frequency, thereby generating an alternating signal at the output. FIG. 9 shows a full-bridge inverter. The switches S1 and S2 are controlled such that they are never closed at the same time. Similarly, the switches S3 and S4 are controlled such that they are never closed at the same time. Alternatingly switches S1 and S4 are closed while S2 and S3 are open, and then S2 and S3 are closed while S1 and S4 are open, thereby creating a square wave signal at the output. The switches are opened and closed with the desired frequency.

Figure 10:
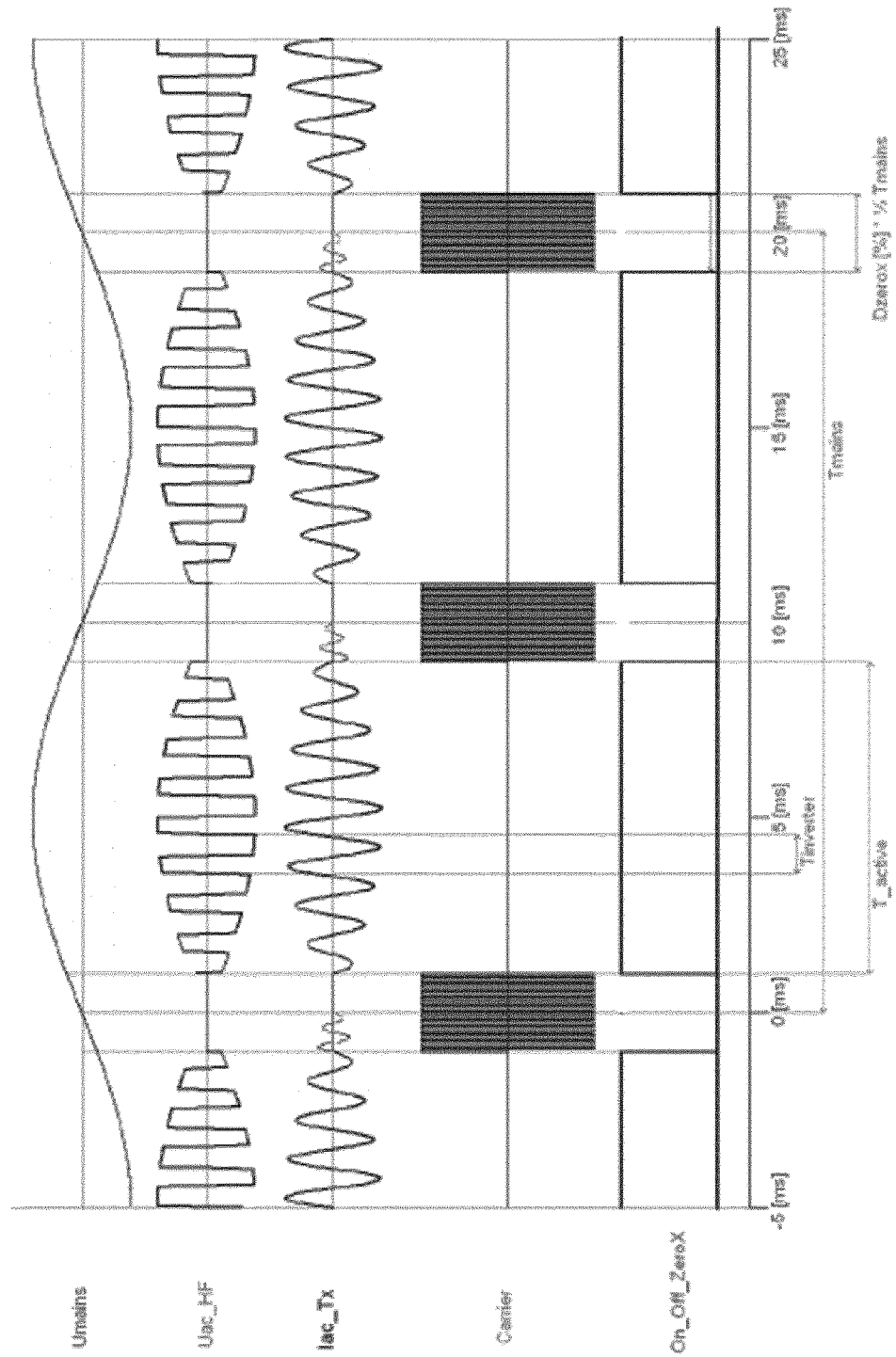
FIG. 10 illustrates an example of signals of a power transfer system.

In this way the drive signal $U_{ac\_HF}$ as show in FIG. 10 may be generated resulting in the current through the power transfer coil 307 corresponding to that shown as $I_{ac\_Tx}$.

In the system of FIG. 7, the signal generated by the frequency converter is not directly fed to the power transfer coil 307. Rather, the signal is fed to a limiter which is arranged to restrict the power of the drive signal that is fed to the inductor such that this power is below a given threshold during the repeating time intervals, i.e. during the communication intervals. The output of the limiter is fed to the power transfer coil 307 (via the tank circuit 305 in the specific example), i.e. the coupling includes a resonant circuit.

As a specific example, the limiter may simply restrict the power of the signal being fed to the power transfer coil 307 by disconnecting the power transfer coil 307 from the output of the power transfer circuit 701. Thus, in the example, the signal from the frequency converter is coupled to the power transfer coil 307 during power transfer periods which are interrupted by communication periods in which the signal from the drive signal is not coupled to the power transfer coil 307.

The limiter may also be an intrinsic part of the inverter. As a specific example, the switches in a full bridge inverter, which are normally switched with a phase difference, meaning that at least part of the time the switches S1 and S4 are closed while S2 and S3 are open and vice versa, generation of the square wave can be stopped by switching without phase difference meaning that switches S1 and S3 are closed while S2 and S4 are open and vice versa. In general, the strength of power signal can be controlled by the phase in the full bridge. The more the switches are in phase the lower the amplitude of the power signal, the more the switches are out-of .phase, the higher the amplitude of the power signal.

FIG. 10 illustrates an example of the signals that may occur in the power transmitter 2 of FIG. 7. The figure first shows the signal Umains which is the mains signal fed to the power source. This signal is full wave rectified to generate a signal level varying power source signal corresponding to Udc_abs as shown in FIG. 4. The frequency converter then converts this to a high frequency signal corresponding to Uac_HF of FIGS. 4 and 10. However, rather than just feeding this signal to the power transfer coil 307/resonant circuit, the signal is gated (i.e. connected and disconnected) in accordance with the gate signal On_Off_ZeroX signal shown in FIG. 10. When this gate signal has a high value, the power transfer signal generated by the frequency converter is coupled to the power transfer coil 307/resonant circuit and when this gate signal has a low value, the power transfer signal generated by the power signal generator 303 is not coupled to the power transfer coil 307/resonant circuit. Thus the resulting signal after gating is shown as Uac_HF of FIG. 10 which after smoothing by the resonant circuit becomes signal Uac_Tx of FIG. 10. Thus, the power transfer signal fed to the power transfer coil 307 corresponds to the signal Uac_Tx of FIG. 10 in this specific example.

As an example, the limiter may be incorporated with the half or full bridge inverter. When the gate signal On_Off_ZeroX signal has a low value, all the switches of the half or full bridge inverter can be switched into the non-conducting state, making the power signal not coupled to the transmitter coil The gating signal thus defines power transfer periods in which the power transfer drive signal is fed to the power transfer coil 307. These power transfer periods are interrupted by communication time periods in which the power transfer signal is not fed to the power transfer coil 307. In the system of FIG. 7, these communication time intervals are instead used for communication between the power transmitter 2 and the power receiver 5.

In this way, the system adopts a repeating time frame which in the specific case is divided into two time periods/intervals, namely one for power transfer and one for communication.

In the system of FIG. 7, the communication is achieved by the power receiver 5 load modulating a carrier signal generated by the power transmitter 2 and fed to the communication coil 407. Thus, the communication is based on a communication carrier being generated during the communication intervals, e.g. a carrier corresponding to the signal denoted Carrier in FIG. 10 may be generated, and this carrier can then be load modulated to communicate data. In other embodiments, forward communication from the power transmitter 2 to the power receiver 5 may e.g. be achieved by the carrier itself being directly modulated, e.g. it may be amplitude, frequency or phase modulated as will be understood by the skilled person.

In the example of FIG. 7, the power transmitter 2 comprises a synchronizer which is arranged to synchronize the time frames, and thus the communication and power transfer periods to the power source signal. The synchronizer may be arranged to control the timing of the time frame and the periods in dependence on variations in the power source signal. For example, the synchronizer may be arranged to isolate an AC component from the power source signal and to synchronize the communication periods to periodic variations in the AC component.

The synchronization of the time frame to the power source signal may allow the impact on the power transfer of introducing dedicated time intervals for communication to be minimized. For example, the timing of the communication periods may be selected to coincide with intervals wherein the power of the power signal is at the lowest. It may also in many scenarios facilitate the synchronization between the power transmitter and the power receiver as the power signal typically comprises signal components that are dependent on the power source signal, and which accordingly reflect the variations in the power source signal. Therefore, the power receiver may be able to synchronize to the variations in the power signal, and this synchronization may inherently also synchronize the power receiver to the variations in the power source signal. Thus, a common synchronization can be achieved without requiring dedicated synchronization information to be exchanged, and thus can be achieved with a reduced overhead.

The system of FIG. 7 accordingly applies a time frame in order to divide the operation into power transfer periods and communication periods. During the power transfer periods, a power transfer signal is inductively coupled from the power transmitter 2 to the power receiver 5 thereby providing the wireless transfer of power. In some embodiments, no communication takes place during the power transfer periods. In other embodiments, some communication may take place during power transfer intervals, e.g. the power transfer signal may be load modulated by the power receiver 5 in accordance with the Qi standard version 1.0 and 1.1.

During the communication periods, data can be communicated between the power receiver 5 and the power transmitter 2 but with no power transfer being performed. Specifically, the power transfer signal is not fed to the power transfer coil 307 and in some embodiments the power load 317 is not coupled to the receiver coil 313 (in other embodiments the power load may still be coupled to the receiver coil 313 even though no power transfer signal is provided). Thus, no electromagnetic fields are induced or modified due to the power transfer operation, and therefore a much cleaner electromagnetic environment is created for communicating data by wireless induction.

The power transmitter 2 and power receiver 5 may thus apply a cyclically repeated time-slotted frame in which one slot (the communication period) is reserved for data communication and a second slot (the power transfer period) is reserved for power transfer. This specifically allows the conditions and parameters (e.g. frequency, amplitude, signal shape) for data transfer to be optimized in the data communication slot while the conditions and parameters for power transfer can be optimized in the power transfer slot. Furthermore, the power transfer operation will not degrade the communication.

The communication periods will typically have relatively short duration compared to the duration of the power transfer periods in order to reserve more time for the power transfer. Typically, the duration of the communication period will be less than 10% or even 5% of the total time frame (e.g. given by the duration of a power transfer interval and a communication interval). In many embodiments, the communication periods will have a duration of no less than 1 ms and no more than 5 ms. This may in many embodiments provide an advantageous trade-off between communication and power transfer requirements and may specifically provide a suitable communication bandwidth without unduly reducing the power transfer capability of the system.

In the system, the timing of the communication periods are not random but are synchronized to the level variations of the power source signal. Specifically, the communication intervals are synchronized to the level variations such that they occur when the levels are below a given threshold, and specifically the communication intervals are synchronized such that they occur around minima of the power source signal. The communication intervals can specifically be selected such that they are centered on the time instants corresponding to the minimum values of the power source signal.

In examples such as that of FIG. 10, these minima occur at the times of zero-crossings of the AC signal which is fed to the power source. Thus, in the example, the power transmitter 2 may include a zero crossing detector which detects the zero crossings of the input mains (derived) signal. These zero crossings may then be used to adjust the timing of the communication intervals such that these are centered on the zero crossings.

In other embodiments, the system may e.g. time the communication intervals to occur at minima which do not coincide with the zero crossings of the AC input signal. For example, if the rectifier 301 comprises a smoothing capacitor which results in a power source signal which is smoothed but still has a very high ripple, the minima will no longer coincide with the zero crossings. In this case, these minima may be detected directly in the rectified source signal and used to time the communication intervals.

In many embodiments, the synchronizer may be arranged to directly synchronize to the power source signal by detecting the changes in the power source signal and adjusting the timing of the repeating time intervals accordingly.

For example, a capacitor may be used to remove the DC component of the power source signal. The resulting AC signal may be filtered to remove or reduce noise while allowing the periodic low frequency variations (typically at 50-60 Hz (or double that for full wave rectification)) to remain. The resulting AC signal may e.g. be provided to a Schmitt trigger to generate a square wave signal with binary values. This signal may be input to a phase locked loop which synchronizes an output signal to the input square wave signal. The output signal may be generated to have a desired duty cycle and possibly with a desired time offset relative to the transitions in the input square wave signal. The output signal from the phase locked loop may then be used directly to control the limiter and the data signal receiving circuit 702.

In some embodiments, the synchronizer may not directly synchronize the repeating time intervals to the power source signal by evaluating the power source signal itself but may instead base the synchronization on a signal which itself is synchronized to the power source signal, and specifically on a signal which is derived from the power source signal or from which the power source signal is derived.

It will be appreciated that a synchronizer of the power receiver 5 may use any suitable approach for synchronizing to the communication intervals introduced by the power transmitter 2. For example, if the power transmitter 2 does not introduce a carrier, the signal induced by the power transmitter 2 may have a characteristic corresponding to that of the signal Uac_HF of FIG. 10. The synchronizer can then proceed to detect the time intervals in which the induced power signal is zero, and can then synchronize to these detections.

The time frame timing will typically be readily available in the power transmitter 2 as the same time base that is used to control (e.g. gate) the power transfer signal. At the power receiver 5, the timing can be derived from the power transfer signal itself by detection of the transitions between the power time intervals and the reduced power time interval based on the power level variations (e.g. using a Schmitt trigger circuit). For example, a first phase locked loop may be based on falling edge transitions (i.e. from power time interval to reduced power time interval) to generate a time base signal synchronized with the transitions from power time intervals to reduced power time intervals. A second phase locked loop may be based on rising edge transitions (i.e. from reduced power time intervals to power time intervals) to generate a time base signal synchronized with the transitions from reduced power time intervals to power time intervals. Then two generated signals may have a duty cycle of e.g. 50% and time base signal synchronized with both transitions can be generated by combining the two generated signals (using e.g. an OR or AND function).

In the previous examples, the drive signal is only coupled to the power transfer coil 307 during the power transfer intervals. However, it will be appreciated that in other embodiments, the signal may be fed to the power transfer coil 307 also during the communication intervals but with the power of the signal fed to the power transfer coil 307 being restricted by a limiter to be below a given threshold. The threshold may be a fixed and predetermined value, or may e.g. be a variable threshold. For example, the maximum power of the power transfer signal being fed to the power transfer coil 307 during the communication intervals may be adjusted based on the error rate for the communication taking place in the communication intervals. For example, if the error rate increases above a given level, the power threshold is reduced and if the error rate decreases below a given level, the power threshold is increased.

Accordingly, the system of FIG. 7 allows such a short range communication link to co-exist with the strong magnetic signal generated by the power transmitter 2 for the power transfer by adapting the power transfer signal to use a time division time frame and by synchronizing the short range communication to this time frame.

In particular, rather than use a continuous power transfer as in existing systems, the current systems applies a time frame to the inductive power signal/power transfer signal. The time frame comprises at least two types of time periods/intervals/time slots, namely power transfer periods in which a power transfer signal having the power required for the power transfer is generated and a communication periods being reduced power time intervals in which only a reduced power level power transfer signal is provided. Indeed, in many embodiments, the power transfer signal may be completely switched off during the communication periods. The approach of adapting the power transfer operation and effectively making this discontinuous allows the short range communication to co-exist with the power transfer. The approach allows the short range communication to be performed during the power transfer phase.

In most embodiments, the duration of the power transfer period (or the combined duration of the power transfer periods in case there is more than one) within each time frame is longer than the communication period (or the combined duration of the communication periods in case there is more than one) within each time frame. In many embodiments, it is at least 2, 3, 5 or even 10 times longer. In embodiments, wherein each time frame comprises only one power transfer period and one communication period, the duty cycle (for the reduced power time interval) is typically no more than 20%, 10% or even 5%.

This may typically be advantageous by providing sufficient time for establishing a communication channel of sufficient capacity without unacceptably affecting the power transfer.

Figure 1:
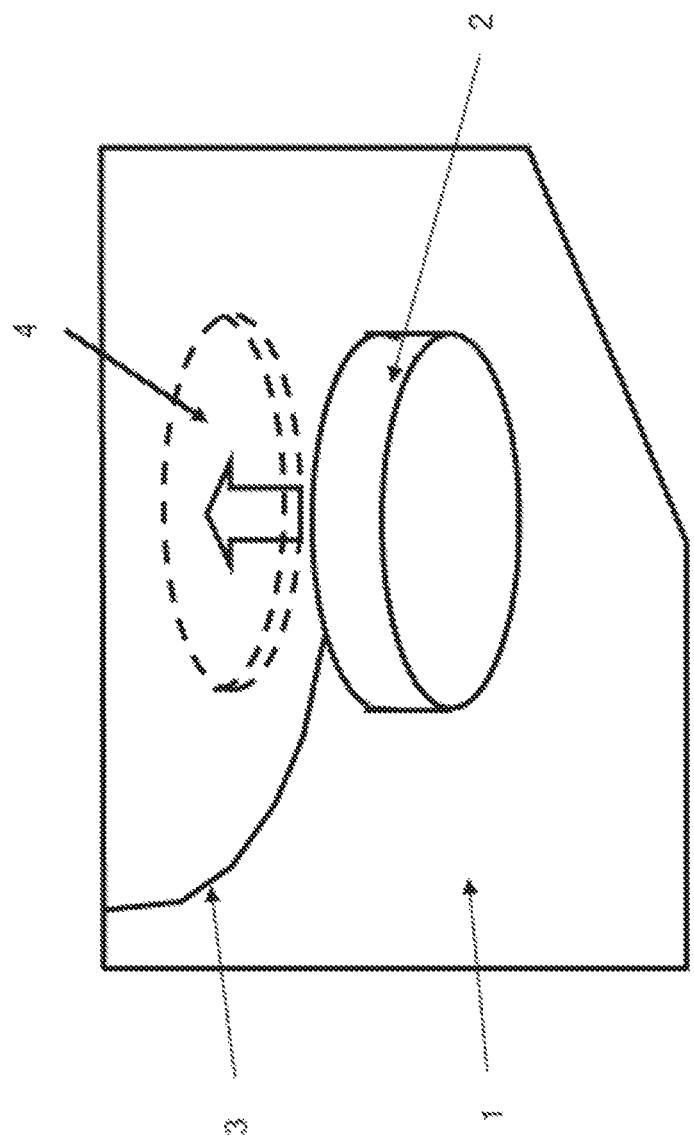
FIG. 1 illustrates a part of a power transfer system integrated in a table top
Figure 2:
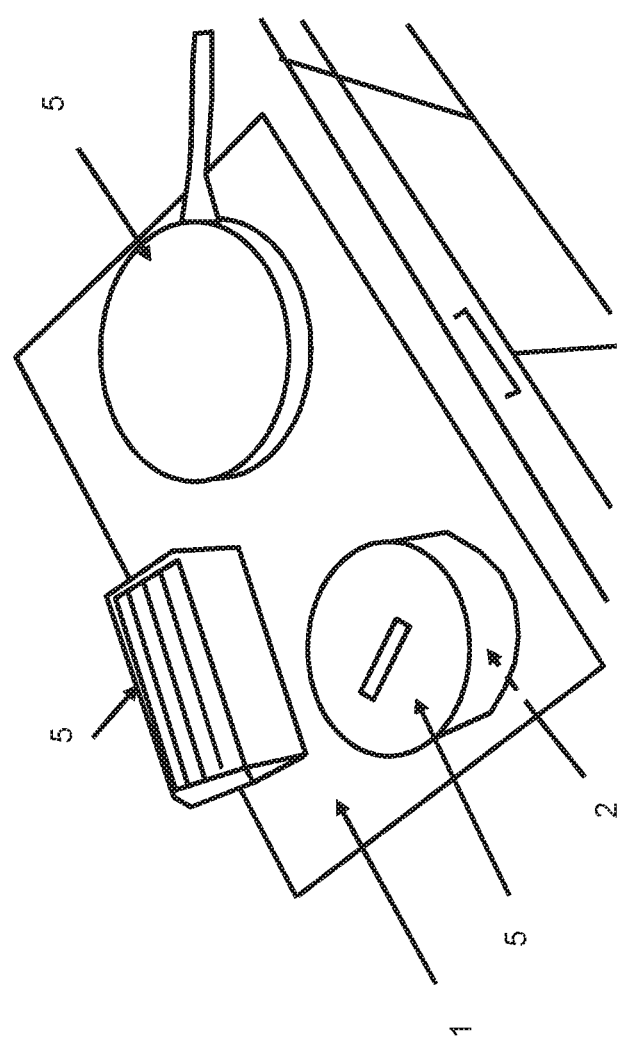
FIG. 2 illustrates a power transfer system with various to be powered appliances.
Figure 11:
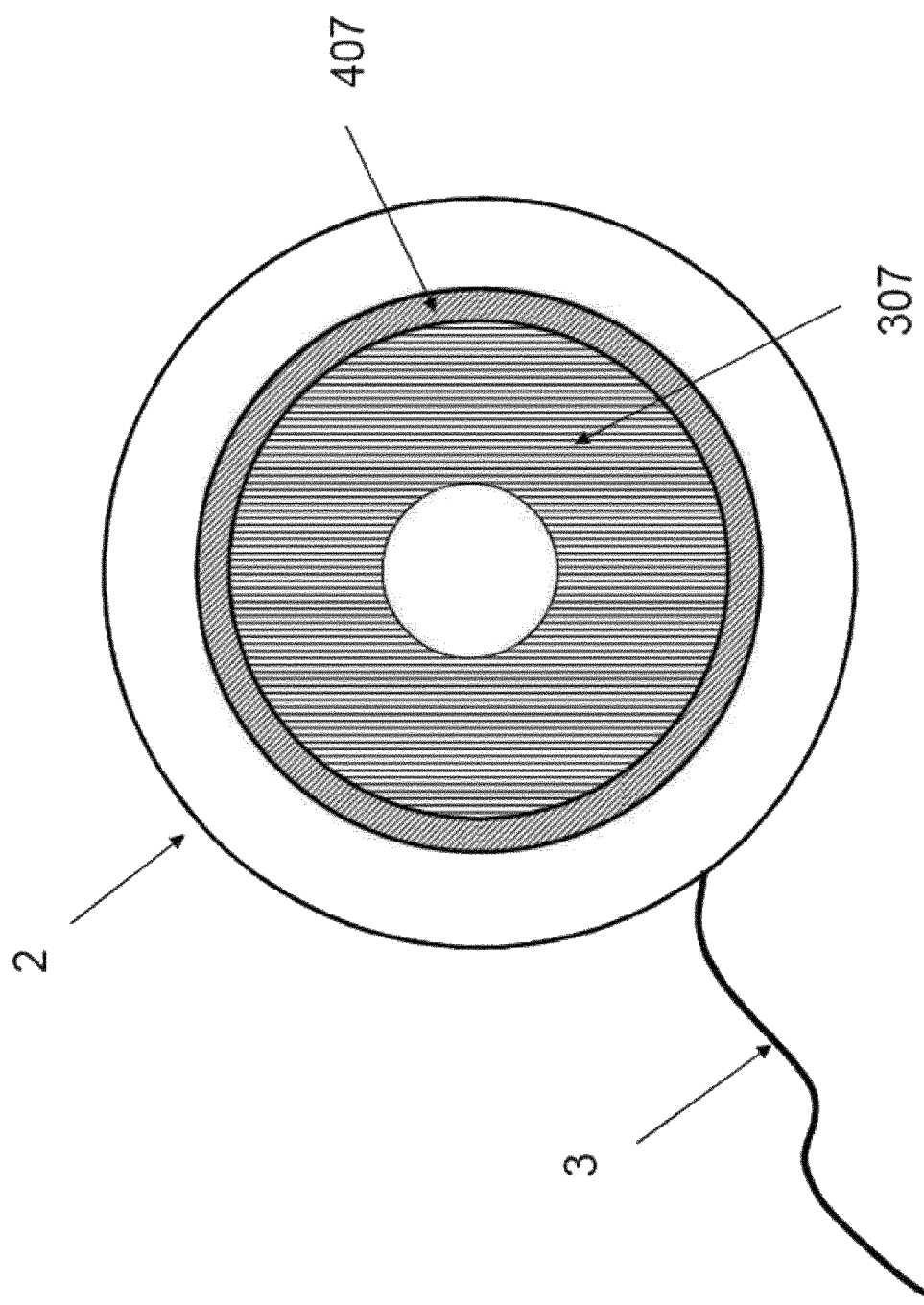
FIG. 11 illustrates an arrangement of power and transmitter coils in power transmitter.

The time frame may typically have a duration of no less than 5 ms and no more than 200 ms. Furthermore, the time frame is a periodically repeating time frame. Accordingly, the repetition frequency is typically no less than 5 Hz and no more than 200 Hz. This may provide improved performance in many scenarios and may specifically allow the short range communication system to provide sufficiently fast communication with the maximum wait time period until data can be communicated being reduced to durations that will not result in unacceptable impact on the power transfer performance. Thus, it will tend to provide sufficiently fast response times for the power transfer to remain effective. For a compact design and to reduce as much as possible the possibility that signals from power receivers other than the one driven are received and/or interfere with the correct data signals, the communication and power channels end up with almost a one-to-one relationship, e.g. the communication coils should share the same magnetic plane as the power coils (e.g. the transmit communication coil and the transmit power coil must be in the same magnetic plane, and the receive communication coil and the receive power coil must be in the same magnetic plane). FIG. 11 illustrates such an arrangement, which is a preferred arrangement. FIG. 11 shows a view on the power transmitter 2 with cord 3 schematically shown in FIG. 1. The view is on the side of the power transmitter 2 that in operation is facing for instance the table top of FIG. 1 and schematically shows an embodiment of positions of the power coil 307 and communication coils 407 of the power transmitter 2.

The communication coil 407 is arranged in one plane with the power coil 307. The communication coil 407 can be arranged around the power coil 307, tightly connected so that communication happens only with one locally powered device.

The close physical correspondence between the communication coil 407 and the power coil 307 can provide a close one-to-one relationship between the power transfer and the communication. Specifically, this can ensure that the data received/transmitted over the communication channel is indeed data that relates to the power transfer via the corresponding power transfer channel, i.e. it can be ensured with a sufficiently high probability that the communication is indeed between the power transmitter and power receiver between which the power transfer is performed. This can prevent or reduce the risk that undesirable scenarios occur where the power transfer operation is controlled by a different nearby power receiver than the power receiver being powered by the power transmitter.

It will be appreciated that FIG. 11 merely provides an exemplary arrangement. However, in general, within any compact design, the magnetic coupling between the transmit power inductor 307 (usually in the form of a coil) and the transmit communication inductor 407 can have a relatively large value.

A coupling factor between the transmit power inductor 307 and the transmit communication inductor 407 of 0.3 to 0.5 can typically be expected.

Thus, although the time division achieved by the time frame being divided into communication and power transfer periods can result in the power signal having a negligible (or at least low) influence on the communication signal during the communication periods (since the amplitude of the power signal may in many embodiments be reduced to a very small or even zero value during the communication periods), a large voltage across the transmit communication coil is typically generated during the power transfer periods. Depending on the inductance values of the communication coil, the voltage across it may in many practical implementations reach several hundred volts. Although the voltage across the communication coil could be reduced by decreasing the inductance value of the coil, the voltage may in practice often still reach 100 V or higher, even with a coil having e.g. 1 or 2 windings. For example, with an inductance value of 3 µH, corresponding to a 21.4 cm coil having 2 windings, the voltage may for many practical power transfer still reach 120 V or more.

Figure 12:
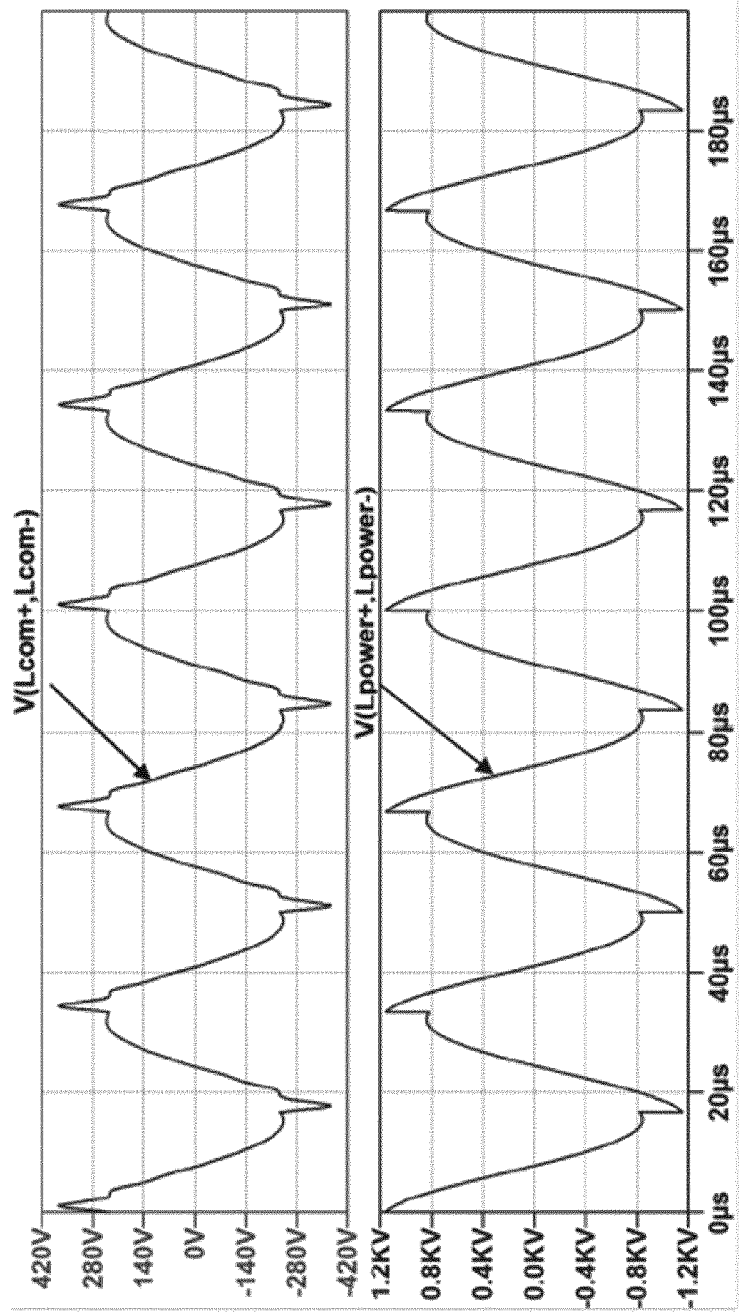
FIG. 12 describes typical voltage signals across the power and communication coils that can be expected during the power transfer phase.

FIG. 12 illustrates effects of the coupling between the power coil 307 and the communication coil 407. FIG. 12 illustrates an example of typical voltage levels that may be expected during a power transfer phase across the transmit communication coil (top) and transmit power coil (bottom). In this example, the inductance of the power coils 307 and 313 (Tx and Rx) is set to 42 µH, the inductance of the communication coils 407 and 413 (Tx and Rx) is set to 20 µH, and a coupling of 0.4 between the communication and power coils is considered.

Thus, as can be seen from FIG. 12, even if the data signals are sent during a communication period when the power signal is almost zero, and therefore the power signal itself most likely has a negligible (or little) influence on the communication signal during the communication periods around the zero crossings of the power signal, a large voltage across the communication coil 407 can still be generated during the power transfer periods where the inductive power signal is high. Depending on the inductance values of the communication coil, the voltage across it could reach several hundred volts, as illustrated in FIG. 12. Although the voltage across the communication coil could be reduced by decreasing the inductance value of the coil (but at a cost of reducing the sensitivity), the voltage across it can in practice still reach 100 V or higher even with a coil having 1 or 2 winding. For example, with an inductance value of 3 µH, corresponding to a 21.4 cm coil having 2 windings, the voltage across it still reaches 120 V.

The large voltage (and current) levels generated across the transmit communication coil could potentially damage and even permanently destroy circuitry connected or coupled to the communication coil 407 and specifically could damage the communication electronics. This could lead to faulty operation and could result in an unintended operation of the power transfer, e.g. resulting in the power of the inductive power signal being set to the wrong values. A simple solution is to implement electronic components which withstand these large voltages. However, this approach is unwanted since the cost, size, complexity, etc. of the electronics will increase to unacceptable levels.

Figure 13:
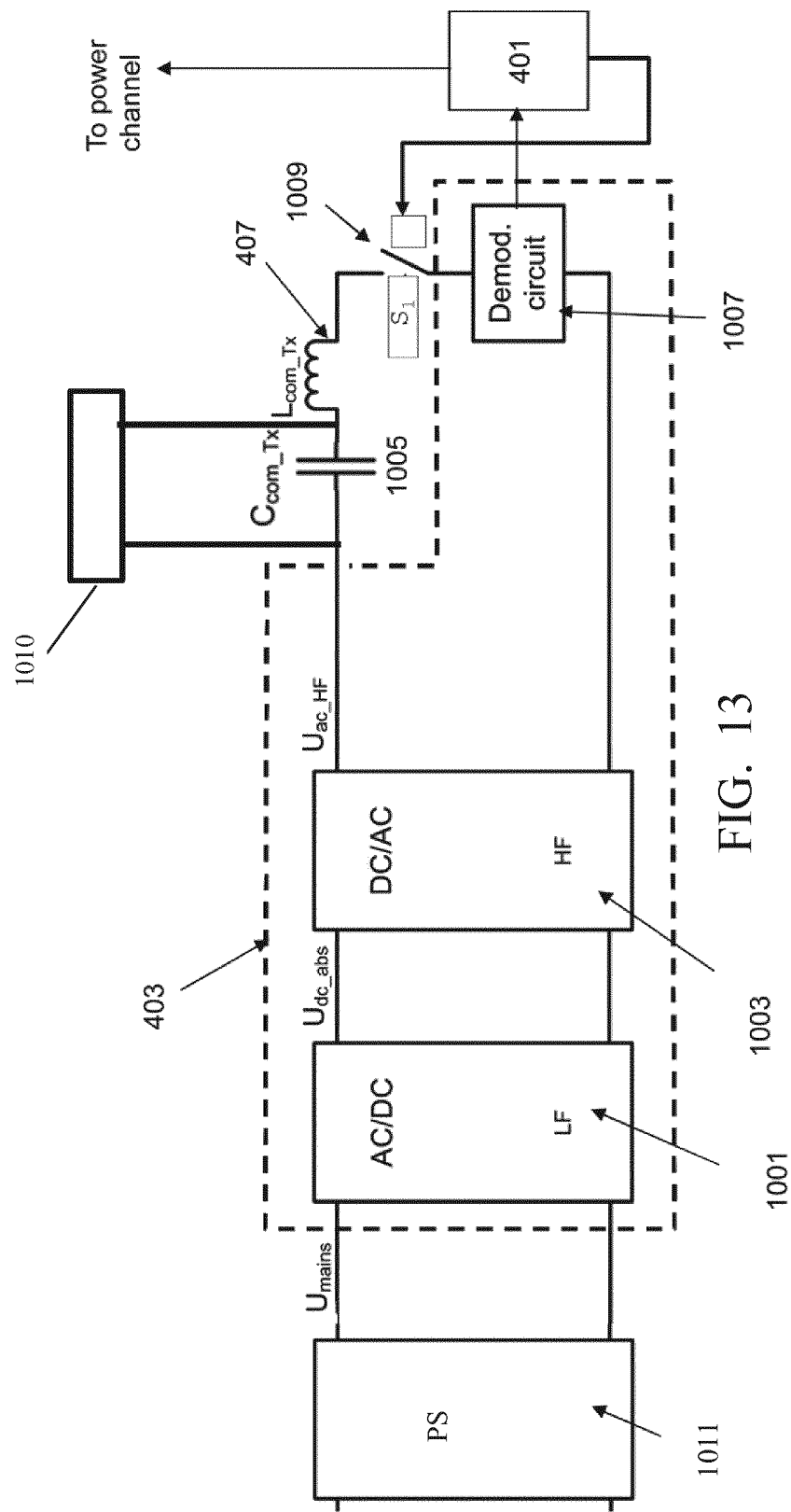
FIG. 13 illustrates an example of elements of a power transfer system in accordance with some embodiments of the invention.
Figure 14:
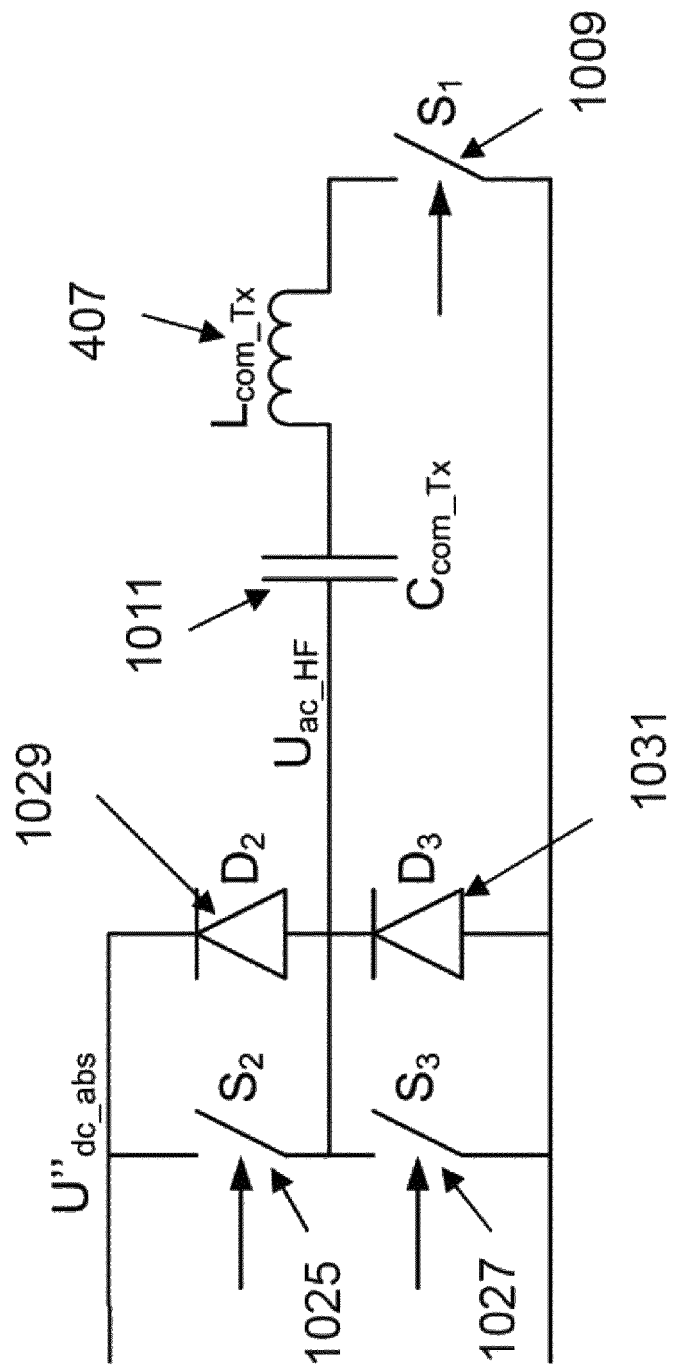
FIG. 14 illustrates an example of elements of a power transfer system in accordance with some embodiments of the invention.

FIG. 13 illustrates an example of communication circuitry of the power transmitter 2. In the example, the second inductor, i.e. the communication coil 407, is arranged to receive data signals from the power receiver 5 (via inductor 413, see FIG. 7) at a period when the power source signal is low, i.e. during the communication period. The communication coil 407 is coupled in series with a communication capacitor 1011, as illustrated in FIG. 14. In the example, the communication coil 407 and the communication capacitor 1011 form a resonance circuit.

Further, in the example of FIG. 13, the communication via the communication coil 407 is a communication of data from the power receiver 5 to the power transmitter 2 achieved by the power receiver 5 load modulating a carrier signal generated by the communication circuitry of the power transmitter and fed to the communication coil 407. The power transmitter 2 comprises a driver 1001, 1003 which generates a drive signal for the resonance circuit formed by the series coupling of the communication coil 407 and the communication capacitor 1011. In typical scenarios, the frequency of the drive signal is set to (at least approximately) correspond to the resonance frequency of the resonance circuit. This may e.g. be achieved by the driver adapting the resonance frequency or by the driver and resonance circuit being designed for the same resonance circuit.

The drive signal is fed to the series coupling of the communication coil 407 and the communication capacitor 1011 thereby causing the communication coil 407 to generate an inductive communication carrier signal which can be load modulated by the power receiver 5 changing a loading by varying a load applied to the receiver communication coil 413.

The resulting variations in the loading of the communication coil 407 and thus the resonance circuit is detected by the communication circuitry of the power transmitter. For example, the current through the communication coil 407 may be measured and the variations may be evaluated to demodulate the data introduced by load modulation as will be known to the skilled person.

The driving of the communication coil 407 during the communication period may be similar to the approach for driving the power transfer coil 307 during the power transfer period.

In more detail, in the specific example, the carrier generator and demodulator 403 comprises a power source 1002 providing a power signal to the driver. Thus, the power source 1002 provides power to the communication circuitry. In many examples, the power signal may be a DC signal. However, in the example, the power signal provided to the communication circuitry is the power source signal $U_{mains}$ also provided to the power transfer circuit. In some embodiments, a transformer or similar may be used to reduce the amplitude of the power source signal $U_{mains}$.

In many embodiments, these approaches reflect an implementation where the power transfer is mains driven and the signal $U_{mains}$ may directly correspond to the main signal.

In the specific example, the carrier generator and demodulator 403 comprises an AC/DC converter 1001 which rectifies the input ac voltage (e.g. the mains) to generate a rectified mains signal which is fed to a DC/AC converter 1003 (Inverter). In contrast to the approach used for generating the drive signal for the power transfer coil 307, the AC/DC converter 1001 comprises a smoothing capacitor and often also a voltage controller resulting in a constant DC voltage being generated. Thus, whereas the rectifier 301 generates a varying DV voltage, the AC/DC converter 1001 generates a constant voltage.

The DC/AC converter generates a high frequency drive signal which is fed to the resonance circuit formed by the communication capacitor 1011 and the communication coil 407. It is remarked that in this example, the communication channel is powered from the mains. Powering from the mains is one way of powering the communication channel. However, the communication channel could also be powered from an external DC supply. In such embodiments, the AC/DC converter (1001) is not necessary.

Preferably the carrier frequency is high, for instance set to values above 500 kHz, for instance in the range of 500 kHz to 2.5 MHz, for instance around 800 kHz.

Preferably the carrier frequency is even higher, in the MHz range (typically 2.55-20, most typically 15-20 MHz). At these frequencies, larger data rates and an easier protection of the communication are achievable.

Thus, in the example, the carrier generator and demodulator 403 comprises a driver (in the specific example formed by the AC/DC converter 1001 and the DC/AC converter 1003 (Inverter)) which generates a drive signal for the series coupling of communication capacitor 1011 and the communication coil 407, i.e. to the resonance circuit. The drive signal is applied to the resonance circuit at least during the communication period (and typically in most embodiments also for part of the power transfer period) of each time frame. The drive signal provides a signal that can be load modulated by the power receiver 5 and the corresponding inductor current variations can be detected.

In the example, the drive signal is generated to have a frequency which is much higher than the amplitude variations of the power supply, and also substantially higher than the frequency of the drive signal for the power coil 307 (i.e. than the frequency of the inductive power signal). Typically, the frequency of the communication drive signal is at least twice that of the inductive power signal.

The power receiver 5 may then load modulate the inductive communication carrier which is generated by the application of the communication drive signal to the communication resonance circuit, for example by changing the loading of the power receiver communication coil 413.

The changed loading results in variations in the current and/or voltage of the resonance circuit of the power transmitter 2. In the example of FIG. 13, the power transmitter comprises a demodulation circuit 1007 for extracting the data signals received by the communication coil 407 and a control unit 401 for controlling the power supplied via the first inductor 307 to a power receiver in dependence on the extracted data signals. For example, the power receiver may transmit power control error messages and the power level of the drive signal for the first conductor 307 may be adjusted in response to these messages thereby forming a power control loop.

The demodulation circuit 1007 is in the example coupled in series with the communication coil 407 and the communication capacitor 1011 and it measures the inductor current through the communication coil 407. In the example, the drive signal may be generated by an inverter 1003 which applies a switching voltage signal and the resulting inductor current will depend on the loading by the power receiver. Accordingly, changes in the loading can be detected by detecting the corresponding changes in the inductor current as is known to the person skilled in the art.

In the example, the communication output circuit generating the inductive communication carrier is accordingly formed by a series coupling of the communication capacitor 1011, the communication coil 407, the demodulation circuit 1007 and the driver 1001, 1003. It will be appreciated that the order of these may vary between different embodiments. Also, in some embodiments other elements may be part of the output circuit, (e.g. coupling capacitors etc.).

In the example, the control circuit 401 is arranged for application of a controlled electrical decoupling of the demodulation circuit from the communication coil 407, in this example by the opening and closing of switch 1009 which is coupled in series with the other components, and specifically in series with the communication coil 407. This switch will also henceforth be referred to as switch S1. To improve the communication, the current flowing through the communication coil 407 preferably flows, at least more major part of it, through the demodulation circuitry when the load modulation is being decoded, i.e. during the communication period. The switch S1 can be a MOSFET switch, as can any of the switches shown in the figures.

However, the voltage across the transmit communication coil can reach several hundred volts during the power transfer periods and this may result in situations which can potentially damage the driver or indeed the demodulation circuit 1007. In particular, due to the high induced voltage, the current flowing through the demodulation circuit 1007 and the driver can reach very large values, typically a few amperes. In the system of FIG. 13, switch S1 is therefore implemented in series with the transmit communication coil 407 to control the current. Specifically, the switch is opened, thereby decoupling the communication coil from the demodulation circuit 1007 and the driver, when the voltage across the communication coil generates a current which is deemed to pose a risk of causing damage to the communication circuitry, and specifically to the demodulation circuit 1007 or the driver 1001, 1003. However, in the example, during most of the power transfer period the switch is open thereby preventing current flowing through the series coupling of the communication coil 407, the communication capacitor 1011, the driver 1001, 1003, and the demodulation circuit 1007.

In the example, towards the end of each power transfer period, the power signal decreases in power the voltage generated across the communication coil also decreases.

In the embodiment, if this voltage falls below an acceptable level (e.g. a voltage which does not damage the communication circuitry), the switch S1 is closed thereby allowing current to flow through the communication output circuit. The switch (S1) connects and disconnects the current path through the transmit communication coil 407, thereby electrical coupling and decoupling the data extraction circuit (1007) from the second inductor (407).

It will be appreciated that in many embodiments, the decoupling/coupling of the communication coil 407 may be achieved by including a switch in series with the communication coil 407 (and thus with the communication capacitor 1011, the demodulation circuit 1007 and the driver 1001, 1003) where the switch can be switched between a short circuit and an open circuit state, i.e. a switch can be inserted in the series circuit and arranged to break or make the circuit. In many embodiments, the switch may be arranged to switch between a closed state wherein the resistance (inserted in the series coupling) is less than 100Ω and an open state wherein the resistance (inserted in the series coupling) is no less than 1 kΩ. Thus, in many embodiments, the communication coil 407 may be coupled in series with a switch element which has a resistance of less than 100Ω when the communication coil 407 is electrically coupled to the demodulation circuit 1007/the driver 1001, 1003 and no less than 1 kΩ when the communication coil 407 is electrically decoupled to the demodulation circuit 1007 and the driver 1001, 1003. Thus, a switch element may introduce a resistance of no less than 1 kΩ during at least part of the power transfer period and of no more than 100Ω during the communication period.

The exact timing of the switching of the switch element may depend on the individual embodiment. In many embodiments, the switch may decouple the communication coil 407 when the communication period ends (e.g. after a predetermined duration from when it started). In other embodiments, the switch may decouple the communication coil 407 when the demodulation circuit 1007 has decoded a full set of data, i.e. when the power transmitter determines that it has detected all the data it can receive in the communication period. For example, if only one bit is transmitted per communication period, the decoupling may occur as soon as the demodulation circuit 1007 has detected one bit.

Similarly, the timing of when the communication coil 407 is coupled to the demodulation circuit 1007 and driver 1001, 1003 may be different in different embodiments. In some embodiments, the coupling (and indeed the decoupling) may simply be performed at predetermined times within each time frame. For example, the switch may couple the communication coil 407 to the demodulation circuit 1007/driver 1001, 1003 8 msecs after the last decoupling. The switch may then wait another 2 msec before again decoupling the communication coil 407. In this way, a simple 10 msec time frame is achieved. Further, this time frame may be synchronized to the amplitude variations of the power transfer signal, e.g. by the midpoint of the communication period, i.e. the midpoint of the 2 msec of coupling, being set to the time of the repeating minima of the amplitude of the power transfer signal.

In some embodiments, the power transmitter 2 may comprise a controller arranged to determine a time for electrically coupling the data extraction circuit 1007 to the second inductor 407 in response to a power level indication for the inductive power signal.

For example, the power transmitter 2 may monitor the power level for the drive signal being fed to the power transfer coil 307, either directly or indirectly (e.g. by measuring the supply power for the inverter 303). When this level drops below a predetermined level, the switch S1 may switch to a closed state thereby coupling the communication coil 407 to the demodulation circuit 1007 and the driver 1001, 1003.

The threshold may be set to a level which is considered sufficiently low for the voltage induced in the communication coil 407 to not cause damage to the driver 1001, 1003 or the demodulation circuit 1007. The threshold may e.g. be determined during manufacturing, by calibration or e.g. by the design and analysis of the physical properties and arrangements of the power transfer coil 307 and the communication coil 407.

In the system of FIGS. 7 and 13, the power transmitter further comprises a discharge circuit 1010 which is arranged to discharge the communication capacitor 1011 during a discharge time interval of the time frame. The discharge time interval at least partially precedes the communication period, i.e. the communication capacitor 1011 is discharged for at least some time during the transmit power estimate. In many embodiments, the discharge interval is terminated prior to the start of the communication period, e.g. the discharge circuit 1010 may stop discharging the communication capacitor 1011 prior to the start of the communication. The communication capacitor 1011 may be fully or partially discharged during the discharge interval.

As an example, during the power transfer period, the power transfer circuit 701 drives the power transfer coil 307. In response, the inductive power transfer signal induces a signal in the communication coil 407. However, the switch S1 is open thereby decoupling the communication coil 407. At some time towards the end of the power transfer period, the discharge time interval starts and the discharge circuit 1010 starts to discharge the capacitor. At this time, the voltage induced in the communication coil 407 is typically reduced thereby in many embodiments providing a more suitable or safer operational environment. After a given duration, the discharge circuit 1010 may stop discharging the communication capacitor 1011. At the same time, the switch S1 may be closed thereby coupling the communication coil 407 to the demodulation circuit 1007, and thereby closing the series coupling of the communication capacitor 1011, the communication coil 407, the demodulation circuit 1007, and the driver 1001, 1003. Shortly after, the driver 1001, 1003 may start to generate a drive signal (i.e. the inverter of the driver may be started) and the communication period may be started. The carrier may be load modulated by the power receiver 5 during this time and the data detected by the demodulation circuit 1007. After a given duration, the communication period may end and the inverter may be switched off so no communication carrier is generated. At the same time, switch S1 is switched to the open position thereby decoupling the communication coil 407. The power transfer period may then begin.

The system of FIGS. 7 and 13 accordingly comprises a discharge circuit 1010 which reduces the charge stored in the communication capacitor 1011 prior to the initialization of the communication period, and typically prior to the start of the generation of the drive signal/communication carrier.

The Inventors have realized that this reduction of charge stored in the communication capacitor 1011 prior to the communication period provides for improved operation in many scenarios. Indeed, whereas the approach of coupling and decoupling of the communication coil 407 may provide an improved operation, the Inventor's have realized that there in practice may be difficulties and issues that prevent optimal operation of the system, and that these may be eliminated or mitigated by the time dependent active discharging of the communication capacitor 1011 prior to the communication period.

Specifically, the breaking of the series coupling achieved by decoupling the communication coil 407, i.e. the opening of switch S1 1009, is intended to prevent any current flowing in the series coupling involving the communication coil 407, i.e. it is intended and expected to prevent current flowing in the series coupling of the communication coil 407 and the communication capacitor 1011, the demodulation circuit 1007 and the driver 1001, 1003 caused by the signal induced in the communication coil 407. Accordingly, it would be expected that the state of this circuit is unchanged during the most part of the communication period. However, the Inventors have realized that in practice, this may not be the case, and instead some current may flow resulting in a state change, which may be detrimental to the operation of the system.

As an example, FIG. 14 illustrates an example of a typical output circuit of the communication part of the power transmitter 2. In the example, the communication coil 407 is driven by a half bridge inverter formed by switches S2 1015 and S3 1027, and diodes D2 1029 and D3 1031. In addition, switch S1 1009 is included to break or make the series coupling (the demodulation circuit 1007 is not shown in the example). During the communication period, S1 is closed and the inverter drives the resonance circuit formed by the communication coil 407 and the communication capacitor 1011. However, during at least part of the power transfer period, S1 is open and the communication coil 407 is decoupled from the inverter (and the demodulation circuit 1007). Accordingly, the state of the circuit is not expected to change.

However, the Inventors have realized that due to the switches not being ideal components, there will in practical applications typically be some current flowing even during this time. They have further realized that this may affect the operation of the output circuit.

For example, in practice, the switches S1, S2 and S3 may be implemented by Field Effect Transistors (FETs). Due the parasitic properties of these components, a small current may still flow even when switch S1 is open. For example, during most of the power transfer period, the inverter may be switched off which typically is done by statically keeping S2 open and S3 closed. However, due to leakage in switch S1, any voltage generated in the communication coil 407 will result in some current flowing in the circuit. In other embodiments, parasitic components, such as body diodes (specifically D2 and D3 of FIG. 14), will result in the possibility of current flowing in the circuit despite the communication coil 407 being decoupled. This may result in the state of the circuit changing, and this may result in disadvantageous operation in some embodiments. For example, it may result in high initial currents when switch S1 is closed. As another example, it may prevent effective driving of the communication coil 407.

In the described system, these effects are mitigated by the selective discharging of the communication capacitor 1011 prior to the communication period. In particular, this prevents a high voltage/charge to be present in the communication capacitor 1011 when the switch S1 is closed.

This can then prevent that very high surge currents flow through the demodulation circuit 1007 and the inverter, and thus can prevent high surge currents from potentially damaging the circuitry. Indeed, in the absence of the demodulation circuit 1007, it has been found that the charge over the communication capacitor 1011 in practice may result in a high capacitor voltage (e.g. in excess of 100V) when switch S1 is closed. The high voltage and high charge will result in a high current that may damage the demodulation circuit 1007 and inverter circuitry. However, this can be prevented by the approach of introducing a selective discharge.

Also, the Inventors have realized that a high voltage of the communication capacitor 1011 may prevent effective driving of the resonance circuit formed by the communication coil 407 and communication capacitor 1011. For example, if the inverter is fed by a fixed DC voltage of 30V, an initial voltage of the communication capacitor 1011 of 100V would result in an operating point that could not be controlled by the inverter output of the driver, i.e. the voltages would not allow the switches/FETs 1025, 1027 to effectively drive the resonance circuit. Whereas the voltage and charge build up may be gradually reduced when the inverter starts trying to drive the resonance circuit, relying on this effect will introduce a delay before the communication carrier can be generated. However, the preemptive discharging of the communication capacitor 1011 can reduce the voltage to a level where the inverter output (and specifically the transistors of a half or full bridge inverter) can effectively drive the signal from the outset.

In many embodiments, the demodulation circuit 1007 may be arranged to form a discharge path between the two terminals of the communication capacitor 1011 during the discharge time interval. In some embodiments, the discharge path may simply be implemented by a switch connected between the terminals, or possibly by a switch and a series resistor for limiting the discharge current.

However, in many embodiments the discharge circuit 1010 may be arranged to form an electrical path between the terminals of the communication capacitor 1011 where the electrical path includes the driver 1001, 1003 and the data extracting circuit (1007), and typically also the communication coil 407.

Indeed, in some embodiments, the discharge circuit 1010 may be implemented using the switch S1 1009 which in some embodiments may be closed prior to the communication period, and typically prior to the driver generating the communication carrier, in order to discharge the communication capacitor 1011 via the demodulation circuit 1007 and the driver 1001, 1003. For example, in the example of FIG. 13, the communication capacitor 1011 can be discharged during the discharge time interval by the switch S1 being closed thereby forming a discharge path via the communication coil 407, the switch S1, the demodulation circuit 1007 (not shown) and switch S2 of the inverter.

In many such embodiments, the discharge circuit 1010 comprises a current restricting element for restricting the current through the data extracting circuit (1007) and the driver for at least part of the discharge interval. Thus, rather than the discharge of the communication capacitor 1011 being restricted only by the components of the inverter and the demodulation circuit 1007, the discharge circuit 1010 may include a current restricting element which reduces the current.

In many embodiments, the current restricting element may simply be a resistor. For example, during the discharge time interval, the switch S1 may be closed but with a series resistor that reduces the current. The resistor may be set to a value that reduces the current to acceptable values. E.g. for an initial capacitor voltage of, say 100V, and a maximum allowable current of, say, 2 A, a 50Ω resistor may be coupled in series with the switch S1 when this is closed during the discharge time interval.

In other embodiments, the current restricting element may e.g. be a current limiter which has a non-linear characteristic that limits the current to a given maximum value. For example, a simple current limiter wherein the voltage over a small resistor in the current path is sensed and used to control the state of a transistor in the current path may be used.

The current restricting element may reduce the maximum discharge current, and specifically may reduce the initial surge current. This may in particular protect the circuitry of the demodulation circuit 1007 and the inverter involved in the discharge.

However, in many embodiments, such a current restricting element may be highly advantageous during the discharge time interval but may possibly degrade communication performance. Accordingly, in many embodiments, the discharge circuit 1010 may further be arranged to deactivate the current restricting element during the communication period.

Thus, in many embodiments, the current flowing in the series coupling of the communication capacitor 1011, communication coil 407, the demodulation circuit 1007 and the inverter may be restricted by the current restricting element during the discharge time interval but not during the communication period. This may for example be achieved by the system including a further switch which short circuits the current restricting element during the communication period.

This may in particular in many scenarios increase the communication performance and result in an increased modulation depth which allows for a more reliable detection of the load modulation variations by the demodulation circuit 1007.

The exact time when the current restricting element is detected may depend on the preferences and requirements of the individual embodiment. However, in many embodiments, the time for deactivating the current restricting element (e.g. by short circuiting or removing it from the series coupling) is determined based on the voltage over the communication capacitor 1011.

Thus, in many embodiments, the demodulation circuit 1007 may include a controller which measures the voltage over the communication capacitor 1011 and e.g. switches the current restricting element on or off (e.g. by short circuiting it) in response to this measurement. As a specific example, the controller may be arranged to deactivate the current restricting element when the voltage over the communication capacitor 1011 falls to be below a given threshold. This may allow the current restricting element to provide protection against high currents but to not impact the operation when the charge is unlikely to be detrimental (e.g. when the voltage is sufficiently low for the corresponding current to not be high enough to risk any damage to e.g. the demodulation circuit 1007).

In some embodiments, the controller may alternatively or additionally be arranged to determine the time for deactivating the current restricting element in response to a power level indication for the inductive power signal.

The power level of the inductive power signal can in many embodiments be determined easily and with reasonably high accuracy. For example, the power level is in the specific example directly related to the supply voltage provided to the inverter 303, i.e. voltage $U_{dc\_abs}$ of FIG. 4. This is a relatively slowly varying signal which can easily be measured, and which provides a direct indication of the power level of the inductive power signal. Accordingly, the time for deactivating the current restricting element may be based on this voltage.

The voltage induced in the communication coil 407 depends directly on the power level of the inductive power signal. Therefore, by timing the deactivation of the current restricting element based on the power level of the inductive power signal, the deactivation can be timed to occur e.g. when the inducted voltage has reduced to be below a given threshold. By setting the threshold to a suitable value, this may provide a good indication that a communication period is about to start and accordingly the current restricting element may be deactivated in order to allow optimum communication performance.

In the following, some specific examples will be provided wherein a resistor is used to reduce the current during a discharge time interval wherein the communication capacitor 1011 is discharged via the demodulation circuit 1007 and the driver 1003.

Figure 15:
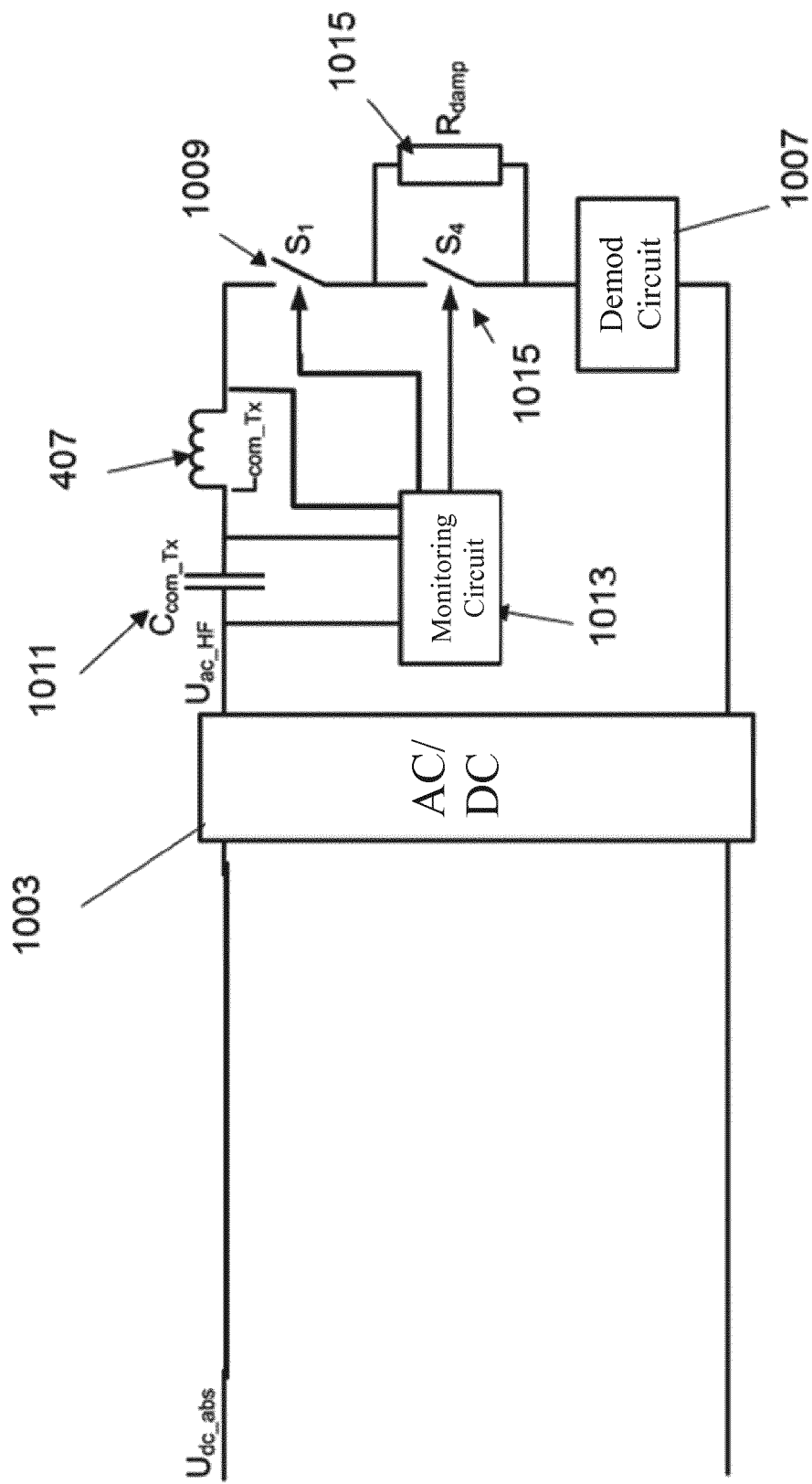
FIG. 15 shows a detail of a preferred embodiment.

FIG. 15 shows a detail of such an embodiment

In the example, a large voltage is present in the resonant tank element, and specifically across the communication capacitor 1011, which is implemented in series with the communication coil 407 $L_{com\_Tx}$, at the end of the power transfer period. In order to provide reliable communication and driving of the communication coil 407 during the following communication period, this capacitance is in the example discharged prior to communication.

A number of steps can be taken:

1. The switch 1009 is closed a few hundred µs before the start of the communication. This allows the discharge time interval to start and the communication capacitor 1011 to begin being discharged. However, the switch S4 1005 is open thereby ensuring that the current restricting element in the form of the resistor $R_{damp}$ is included in the series coupling thereby preventing a large current from flowing through the communication circuitry The exact time at which the switch 1009 is closed depends on the power signal level in the example. Towards the end of each power transfer period, the power signal decreases. Thus, the voltage it generates across the communication coil also decreases. If this voltage falls below an acceptable level (i.e. a voltage which does not damage the communication circuitry), the switch 1009 can be closed. This can be monitored by a monitoring system 1013

2. Since a large current flowing through the communication coil can still occur when the switch 1009 is closed, a damping resistance $R_{damp}$, 1015, (typically around 100 Ohm) is preferably implemented in series with the S1 switch 1009 to provide current restriction. This resistance will limit the current flowing through the communication circuitry.

3. This damping resistance 1013 is preferably short-circuited (i.e. effectively decoupled from the data receiving circuitry) during the communication period so as to prevent a reduction of the demodulation sensitivity of the power transmitter. A further switch 1015, in FIG. 15 indicated by S4, is closed at the start of or shortly after, or preferably shortly before the start of the communication period. Control of the switch 1015 can for instance be implemented by measuring the voltage over $R_{damp}$; calculating the current through $R_{damp}$, and when said current drops below a threshold value, switch S4 can be closed thereby deactivating the current restricting element. It can also be implemented, as shown in FIG. 15, by measuring the voltage over capacitance 1011 by a controller/monitoring circuit 1013.

Figure 16:
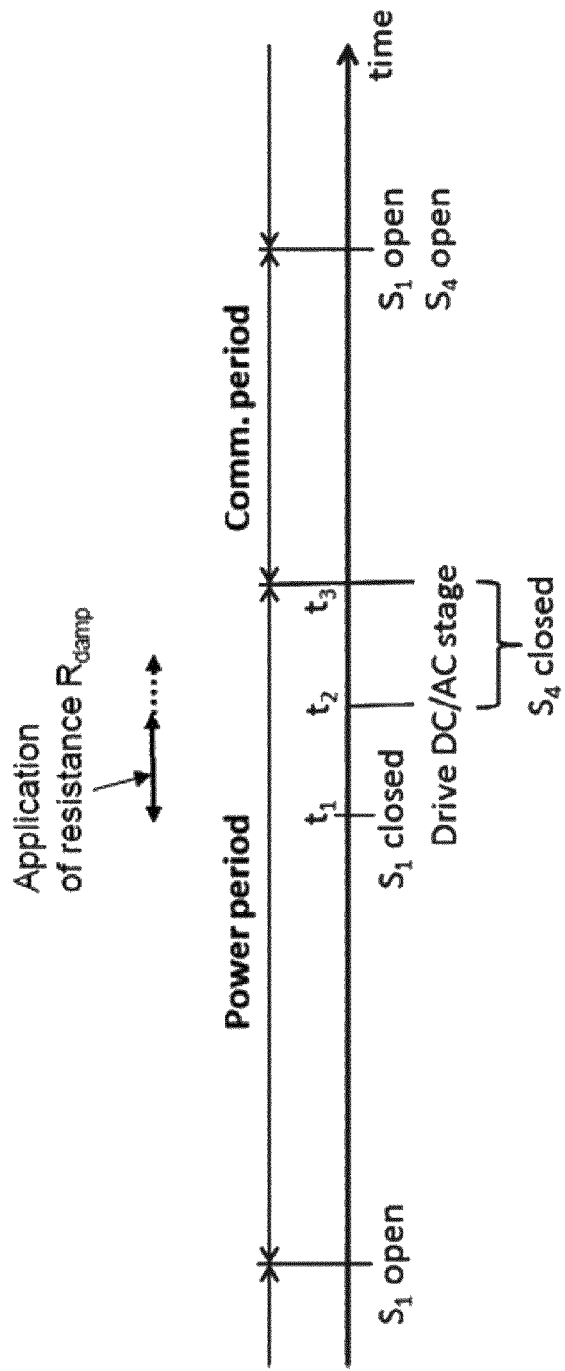
FIG. 16 illustrates the various periods and opening and closing of switches.

FIG. 16 illustrates the various periods of opening and closing of switches, i.e. electrically coupling and decoupling of elements from the circuit or from each other, in the specific example:

At the beginning of the power transfer period switches S1 and S4 are open.

The communication coil 407 $L_{comparator\ 305\_Tx}$ is then decoupled from the demodulation circuit 1007. Shortly before the end of the power period at time $t_1$ and before the start of the communication period switch S1 is closed. The communication coil $L_{com\_Tx}$ is then electrically coupled to the demodulation circuit through the damping resistance $R_{damp}$. This prevents a too large current from flowing through the demodulation circuit. During the power transfer period until time $t_2$, the DC/AC stage does not provide a carrier signal to the communication coil $L_{com\_Tx}$. At time $t_2$, the DC/AC stage is switched on again and provides a carrier signal to the coil. Switch S4 can then be closed any time between $t_2$ and $t_3$, the actual start of the communication period Closing switch S4 short-circuits damping resistance $R_{damp}$, in effect decoupling the damping resistance from the circuit. The set-up also, from a system point of view, reduces the transition time from power transfer to communication. The damping resistance $R_{damp}$ is thus operative in the time period between $t_1$ and $t_2$ and (part of) the time period between $t_2$ and $t_3$. In FIG. 16 this is schematically indicated by the double arrow above the times $t_1$ to $t_3$, where the solid arrow indicated the time period in which the damping resistance in always applied, and the dotted arrow the time period where the damping resistance may be applied.

As already mentioned, the damping resistance is a current restricting element which in the example limits the current through the communication circuitry during the discharge time interval. Its value may e.g. be chosen such that:

$$R_{damp} \geq VS1/Imax \quad (1)$$

where VS1 is the voltage across the switch S1 and $R_{damp}$ at the instant in time when the switch S1 is closed. This voltage is in the same order of magnitude as the voltage across the primary coil. Imax is the maximum allowed current through the communication circuitry. Typically, if VS1 is equal to approximately 100 V and Imax is typically set at 2 A, the damping resistance preferably has a value larger or equal than 50 Ohm. The value of the damping resistance preferably is larger than this threshold value but preferably is not too large. In other words, the damping resistance should ideally be equal or close to the minimum allowed value described in Equation (1). If this resistance is too large, the voltage across the communication capacitor 1011 $C_{com\_Tx}$ does not reach a low enough value before time t3. Part of the discharge would then still occur during the communication period; this can cause damage, but also could interfere with a correct interpretation of the data sent.

Typically, a value between 50 and 200, typically between 80 and 120, for instance around 100 Ohm is selected.

Figure 17:
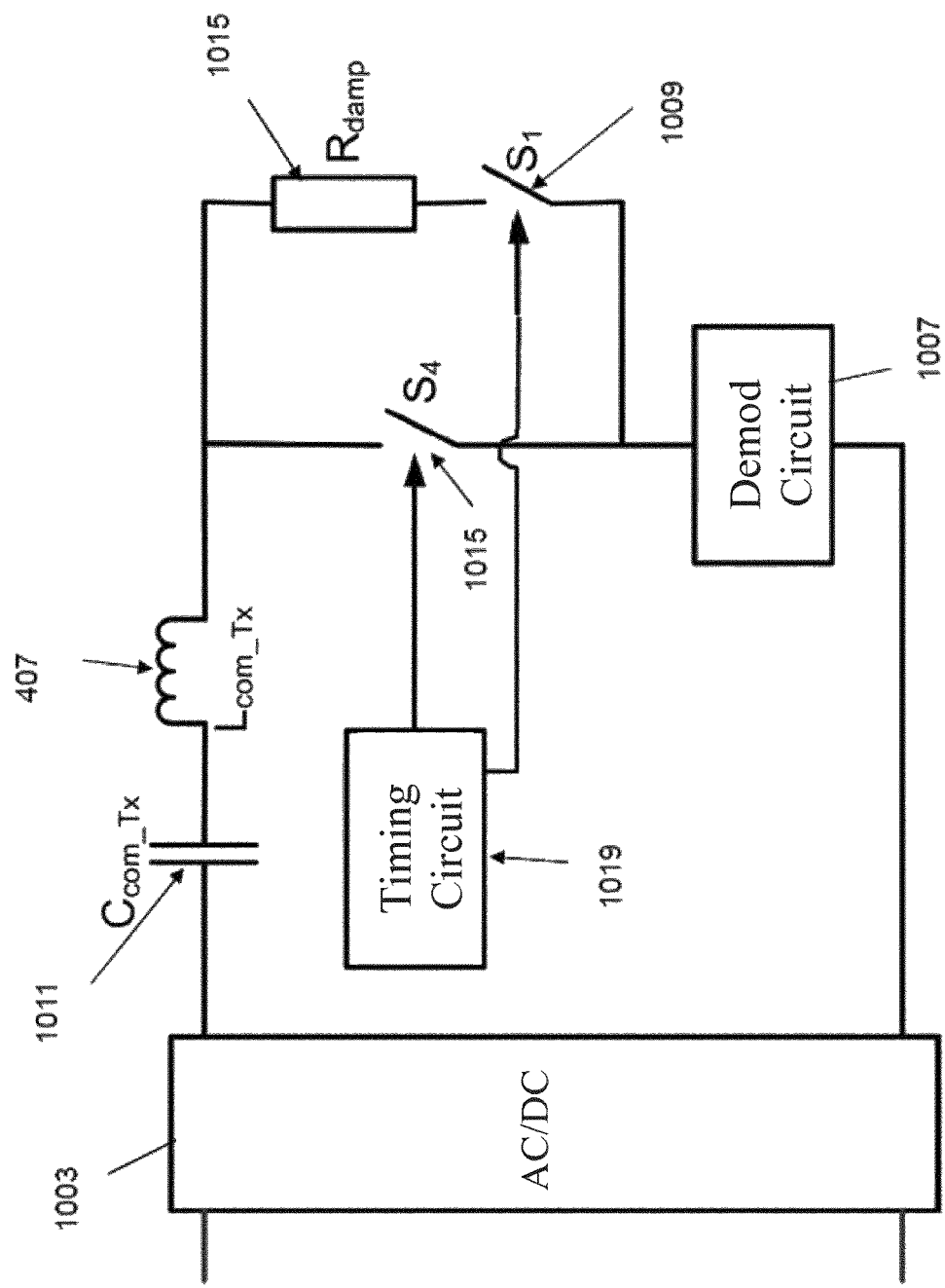
FIG. 17 illustrates a variation on the scheme of FIG. 15.

FIG. 17 illustrates a variation on the scheme of FIG. 15. In this case the switch S1 and the resistance $R_{damp}$ are in series and in parallel with switch S4. When the switch S1 is closed, while switch S4 is still open, the current from the communication coil 407 $L_{com\_Tx}$ flows through the damping resistance $R_{damp}$ to the demodulation circuit 1007; when switch S4 is closed the damping resistance $R_{damp}$ is short circuited. Also, instead of a monitoring circuit a timing circuit is used. The difference between a monitoring circuit and a timing circuit is that in a monitoring circuit the switch is opened or closed when a measurable value (voltage or current through or over an element such as a coil or capacitance, or strength of magnetic flux) reached a threshold value. In a timing circuit the switch is controlled, i.e. opened or closed at a particular point within the time frame of power and communication periods, for instance a fixed period of time (which could be dependent on the type and/or model of the power receiver, which type or model could be provided in the data sent) before the end of the power transfer period or the start of the communication period. Of course a mix of timing and monitoring can also be used, for instance timing for control of one switch and monitoring for the other. The control circuit or circuits may be part of or integrated in a larger control unit. The control may also be exerted in dependence of the kind of device that is being powered.

Figure 18:
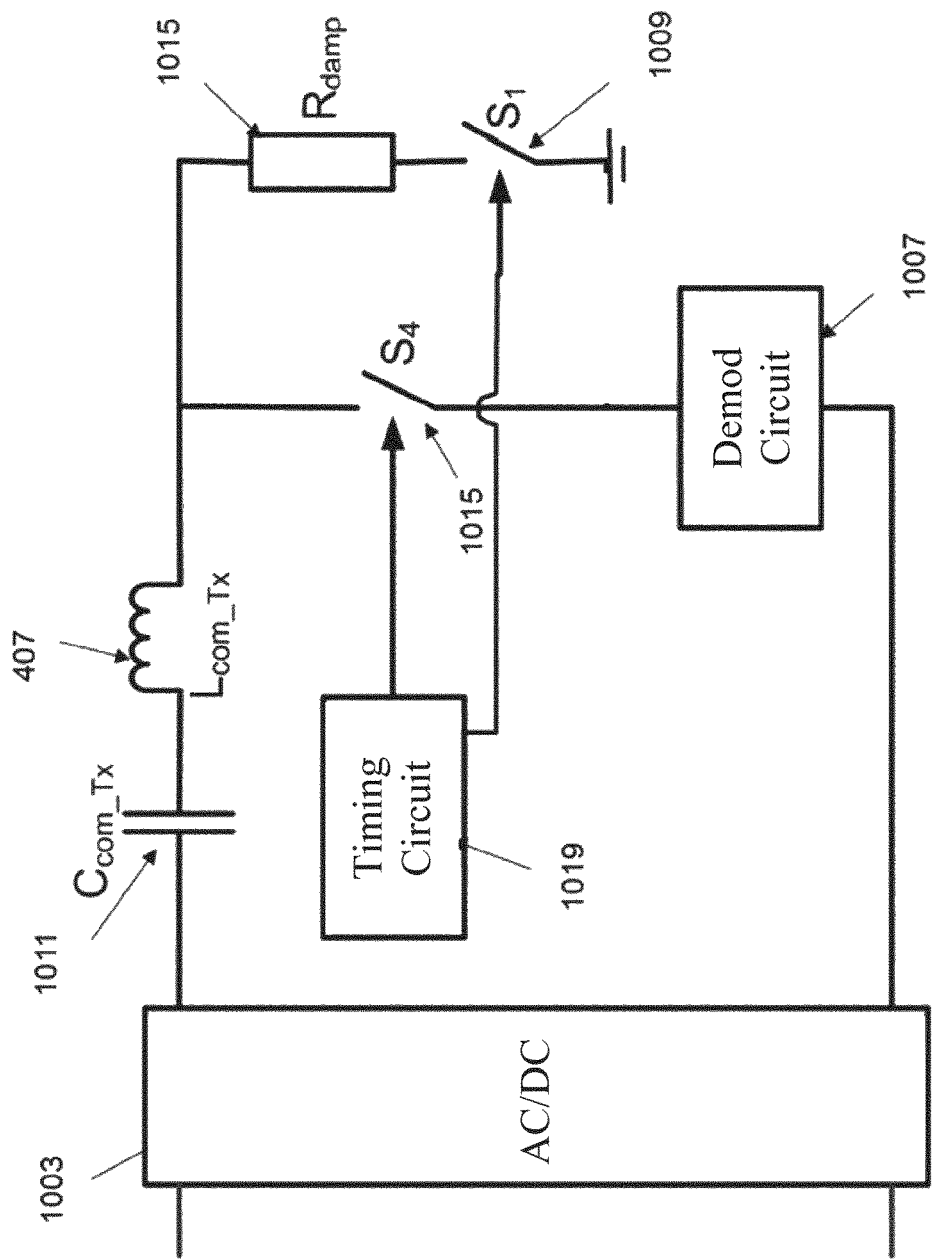
FIG. 18 illustrates a slightly different arrangement for limiting the current through the data extraction circuit.

FIG. 18 illustrates a slightly different arrangement for limiting the current through the data extraction circuit:

When S1 is closed while S4 is open, current flows from the coil $L_{com\_Tx}$ to ground via the damping resistance $R_{damp}$. This can be used, as in FIG. 17 for discharging and/or reducing the voltage on coil $L_{com\_Tx}$ with the difference that in FIG. 17, the current flows to ground, instead of to the demodulation circuit. Some time after closing S1 discharging and/or voltage reduction has been done to an allowable level. When S4 is closed and S1 is open the current flows from the coil $L_{com\_Tx}$ to the demodulation circuit, and communication can be performed. The resistance $R_{damp}$ is effectively decoupled from the circuit during communication because current cannot flow through $R_{damp}$. $R_{damp}$ could be connected to a different point within the circuit, for instance between $C_{com\_Tx}$ and $L_{com\_Tx}$. In all instances the damping resistance $R_{damp}$ can be controllable via switches S1, S4 be made part of the circuit to reduce in a safe manner the voltage over the coil, while decoupling the damping resistance $R_{damp}$ during communication.

In some embodiments, the power transmitter 2 may implement (e.g. as part of the discharge circuit) a controller which is arranged to determine a start and/or end time of the discharge time interval. The start and/or end time may be determined based on an operational parameter.

For example, in many embodiments, the power transmitter 2 may determine a start time for the discharge time interval in response to a power level indication for the inductive power signal.

E.g. in embodiments wherein the instantaneous power level of the inductive power signal follows variations in the supply voltage Umains (such as in the example of FIG. 10), the controller may continuously measure the inductive power signal (e.g. indirectly by measuring the supply voltage Umains). When the power level reaches a given threshold (e.g. 10% of the maximum value), the power transmitter 2 may proceed to entirely switch off the power signal to the power transfer coil 307, such as e.g. illustrated by the signal $U_{ac\_HF}$ in FIG. 10. However, it may proceed to initiate the discharge of the capacitor earlier, and may in particular set the start time for the discharge time interval to the time instant the power level crosses a second, higher threshold. For example, the power transmitter 2 may start discharging the capacitor when the power level drops below, say, 15% of the maximum value.

In some embodiments, the power transmitter 2 may be arranged to measure the voltage of the capacitor and to start the discharge time interval in response to the measured capacitor value. For example, in some embodiments, the capacitor may be continuously charged during the power transfer interval (e.g. via a body diode of a switch resulting in a rectification of the induced current) and thus the voltage may continuously increase during the power transfer period. In such an embodiment, the controller may initiate the discharge time interval if the capacitor voltage increases above a given threshold.

Alternatively or additionally, the controller may in some embodiments be arranged to determine an end time of the discharge time interval in response to the capacitor voltage. For example, as the discharge is started, typically with a current restriction in the form of e.g. a resistor, the voltage will often continuously reduce both due to the discharging and possibly due to the reduction of the power level of the inductive power signal. The voltage may be monitored and if it drops below a given threshold (e.g. relatively close to zero), the discharging may be terminated thereby ending the discharge time interval.

In some embodiments, the power transmitter 2 comprises a controller which is arranged to additionally or alternatively determine a start time for the drive time interval in response to the capacitor voltage. For example, when the capacitor voltage drops below the voltage at which the discharging of the capacitor is terminated, the driver 1001, 1003 may at the same time begin to generate the drive signal for the resonance circuit comprising the capacitor 1005 and the communication coil 407 thereby generating the communication carrier for load modulation. Thus, in some embodiments, the switch of the communication circuit from a state of capacitor discharge to a communication state wherein the resonance circuit is driven to generate a communication carrier may be controlled in response to a measurement of the capacitor voltage.

It will be appreciated that any suitable approach for measuring the capacitor voltage may be used. For example, a high impedance operational amplifier may be coupled across the terminals and with the output being coupled to an analog to digital converter which provides a measured value to a microcontroller controlling the operation of the power transmitter 2.

Figure 19:
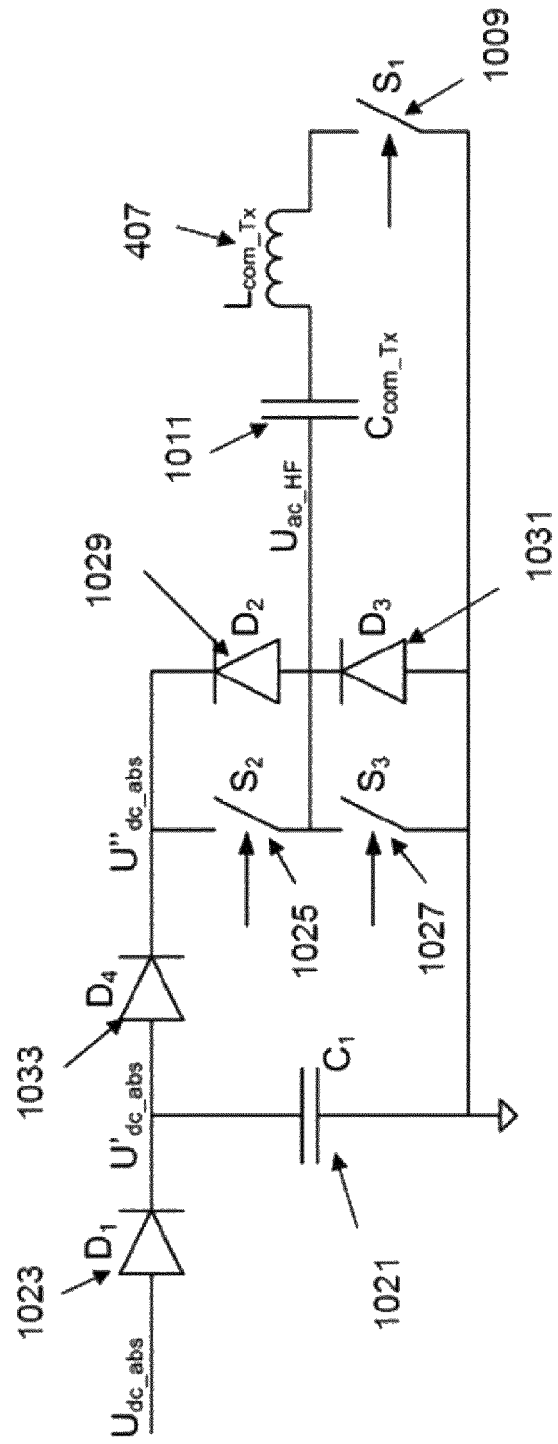
FIG. 19 illustrates an embodiment of the invention comprising protection circuitry for limiting during a power transfer period a voltage at the input node of the DC/AC converter

In some embodiments the data signal receiving circuit comprises an DC/AC converter and protection circuitry for limiting during a power transfer period the voltage at the input node of the DC/AC converter. FIG. 19 illustrates an embodiment thereof.

Figure 3:
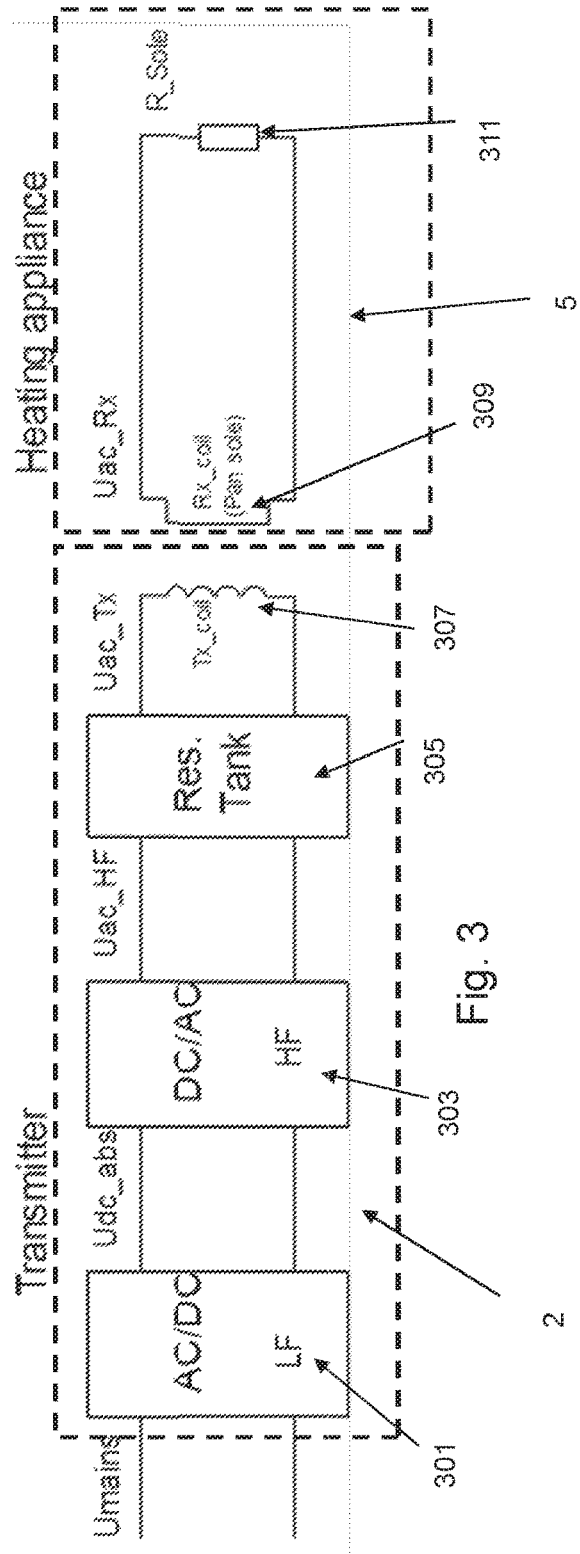
FIG. 3 illustrates an example of a power transfer system in accordance with prior art.

The input node of the DC/AC stage has typically an equivalent input capacitance (C1 in FIG. 19, indicated by number 1021) of several µF (typically around 10 µF). The DC/AC stage is implemented as a half-bridge inverter in FIG. 19. A diode 1023 (D1 in FIG. 3) is usually implemented in order to ensure that the input voltage of the DC/AC stage does not fall under a certain minimum voltage. As previously mentioned, the voltage generated across the transmit communication coil can reach several hundred volts during the power transfer periods. This voltage can be decreased by using a communication coil with a small number of windings (i.e. 1 or 2 windings). Its inductance value, and thus the voltage generated across it will be decreased. However, it is expected that this voltage will still reach values in the range of 50-150 V. Nevertheless, the voltage $U_{ac\_HF}$ at the output node of DC/AC stage will also reach a large voltage since the capacitor $C_{com\_Tx}$ connected in series with the communication coil will be charged by the voltage generated by the power signal. This large voltage can then charge, through the body-diode of the switch S2, indicated in FIG. 19 by number 1025, the capacitance C1 (i.e. if the DC/AC stage is implemented as a half-bridge inverter). It has to be noticed that the switches S2 and S3, indicated by number 1027, of the half-bridge comprising diodes D2, indicated by number 1029, and D3, indicated by number 1031, are open during the power transfer periods. The voltage at the input node of the DC/AC stage can reach a very large value, which is not desirable for a reliable communication. Thus, a diode D4, indicated by number 1033, is preferably implemented at the input node of the DC/AC stage in order to prevent the capacitance C1 of being charged by the large voltage seen at the output node of the DC/AC stage, thereby implementing protection circuitry for limiting during a power transfer period a voltage at the input node of the DC/AC converter. This protection circuitry for limiting during the power transfer period a voltage at the input node of the DC/AC converter can also be implemented independent from the means for decoupling although preferably both protection measures are implemented as shown in FIG. 19.

When the protection circuitry is implemented independent from the means for decoupling the resulting power transmitter comprises a first inductor for providing an inductive power signal to the power receiver, a second inductor for receiving data signals from the power receiver, the first and second inductors being separate inductors in a power transfer circuit and a data signal receiving circuit, wherein the power transmitter comprising a control unit for controlling the power signal supplied in dependence on the data signals received and the power transmitter is arranged to transfer power via the first inductor during power transfer periods and receive data signal via the second inductor during communication periods, the communication periods corresponding to periods wherein power signal is low, and the data signal receiving circuit comprises a DC/AC converter and comprises protection circuitry for limiting during a power transfer period a voltage at the input node of the DC/AC converter.

Another solution to limit the voltage at the input of the half-bridge inverter is to close the switch S3 during the power transfer period. The protection circuit would then be a circuit that closes the switch S3 during the power transfer period or at least part of the power transfer period to limit the voltage at the input node of the DC/AC converter. This closing can be as a function of a monitored voltage. As shown in FIG. 19, the voltage $U_{ac\_HF}$ at the output node of the DC/AC stage is in this case short-circuited with the ground voltage, thus limiting the voltage $U''_{dc\_abs}$ at the input node of the half-bridge inverter.

Figure 20:
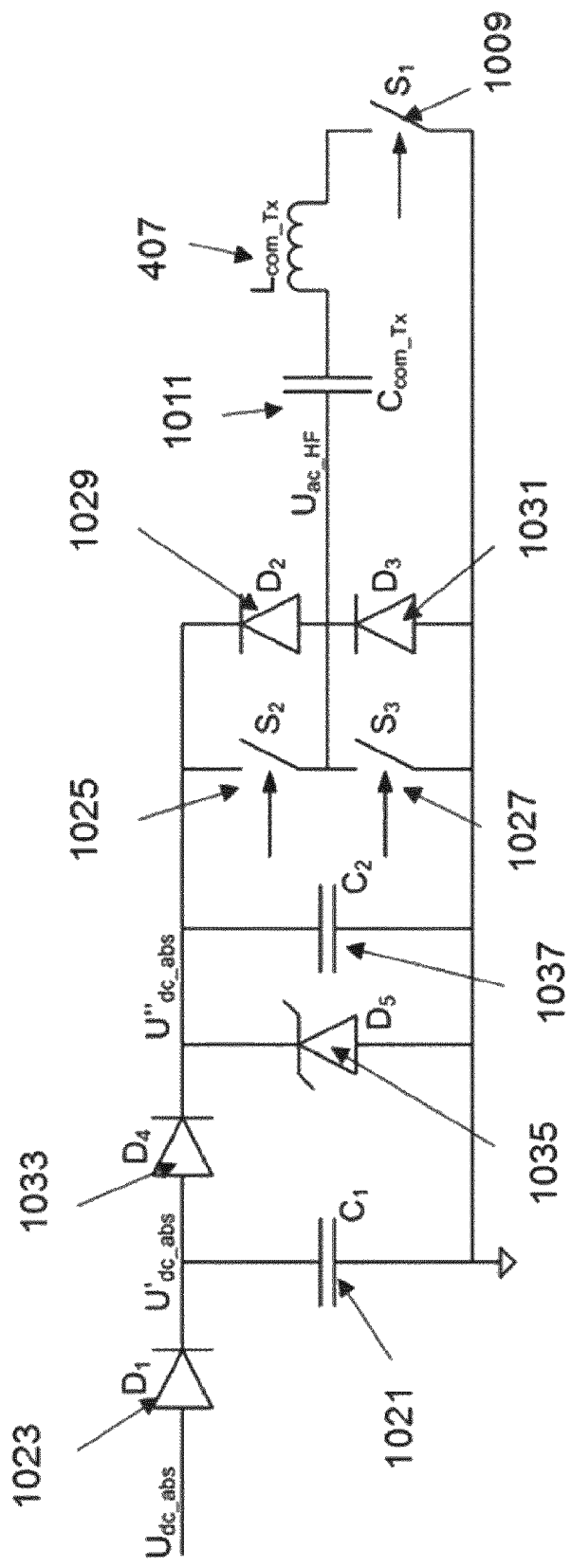
FIG. 20 illustrates a further embodiment of the invention comprising protection circuitry for limiting during a power transfer period a voltage at the input node of the DC/AC converter The figures are exemplary figures; the same parts are generally indicated by the same reference numbers.

Although the voltage across the capacitance C1 is limited, the voltage $U''_{dc\_abs}$ at the input node of the DC/AC stage can still reach very large values. Thus, in order to limit this voltage level, a zener diode D5, in FIG. 20 indicated by number 1035, (typically of 30-40 V) is preferably implemented at the input node of the DC/AC stage, as described in FIG. 20. Moreover, the voltage level at the output node of the DC/AC stage and the voltage across the capacitor $C_{com\_Tx}$ will also be limited. The capacitance C2, in FIG. 20 indicated by number 1037, which represents the equivalent capacitance seen at the input node of the DC/AC stage, as a typical value around 1 nF.

The invention also relates to a power transfer system comprising a power transmitter. It also relates to a power transfer system comprising, in addition to the power transmitter, a power receiver for cooperation with the power transmitter.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for transferring power to a power receiver using an inductive power signal, wherein the power transmitter comprises:
   a first inductor for providing via the first inductor an inductive power signal to the power receiver;
   a second inductor for receiving data signals from the power receiver,
   a capacitor in a series coupling with the second inductor;
   wherein the first and second inductors are separate inductors in a power transfer circuit and a data signal receiving circuit,
   wherein the data signal receiving circuit comprises a data extracting circuit for extracting the data signals received by the second inductor and a driver for generating a drive signal for the series coupling of the second inductor and the capacitor during a drive time interval including the communication period,
   the power transmitter comprising a control unit for controlling the power signal supplied via the first inductor to the power receiver in dependence on the data signals received and
   the power transmitter is arranged to transfer power via the first inductor during power transfer periods of a repeating time frame and receive data signal via the second inductor during communication periods of a repeating time frame, a power of the inductive power signal being reduced for the communication period relative to the power transfer period,
   wherein a control circuit is arranged for application of a controlled electrical coupling of the data extraction circuit to the second inductor during a communication period and electrical decoupling of the data extraction circuit from the second inductor during at least a part of power transfer periods; and the data signal receiving circuit further comprises a discharge circuit for discharging the capacitor during a discharge time interval of the time frame at least partially preceding the communication period.

2. The power transmitter of claim 1 further comprising a controller arranged to determine a time for electrically coupling the data extraction circuit to the second inductor in response to a power level indication for the inductive power signal.

3. The power transmitter of claim 1 further comprising a controller arranged to determine a start time for the discharge time interval in response to a power level indication for the inductive power signal.

4. The power transmitter of claim 1 further comprising a controller arranged to measure a capacitor voltage over the capacitor and to determine a start time of the discharge time interval in response to the capacitor voltage.

5. The power transmitter of claim 1 further comprising a controller arranged to measure a capacitor voltage over the capacitor and to determine an end time of the discharge time interval in response to the capacitor voltage.

6. The power transmitter of claim 1 further comprising a controller arranged to measure a capacitor voltage over the capacitor and to determine a start time for the drive time interval in response to the capacitor voltage.

7. The power transmitter of claim 1 wherein the discharge circuit is arranged to form an electrical path between the terminals of the capacitor, the electrical path including the driver and the data extracting circuit.

8. The power transmitter of claim 7 wherein the discharge circuit comprises a current restricting element for restricting the current through the data extracting circuit for at least part of the discharge interval.

9. The power transmitter of claim 8 wherein the discharge circuit is arranged to deactivate the current restricting element at least during the communication period.

10. The power transmitter of claim 9 further comprising a controller arranged to measure a capacitor voltage over the capacitor and to determine a time for deactivating the current restricting element in response to the capacitor voltage.

11. The power transmitter of claim 9 further comprising a controller arranged to determine a time for deactivating the current restricting element in response to a power level indication for the inductive power signal.

12. The power transmitter of claim 1 further comprising
a power source for providing a periodically varying power source signal, a frequency of periodic variations in the power source signal being no more than 1 kHz;
a power transfer signal generator for generating a drive signal for the first inductor from the varying power source signal, the drive signal having a periodically varying amplitude with an amplitude frequency of no more than 1 kHz; and
a synchronizer arranged to synchronize the communication period to correspond to periodic minima of the periodically varying amplitude.

13. The power transmitter of claim 1 wherein a duration of the time frame is no more than 200 msec.

14. The power transmitter of claim 1 wherein the data extracting circuit is arranged to detect load modulation of the drive signal by the power receiver.

15. Power transmitter according to claim 1, wherein the power transmitter comprises a resistance and a controllable switch for coupling or decoupling the resistance from the data receiving circuit for reducing the current through the data extraction circuit outside the communication period.

16. Power transfer system comprising a power transmitter according to claim 1.

17. Power transfer system according to claim 16, comprising a power receiver for cooperation with the power transmitter, the power receiver having separate inductors for respective coupling with the first and second inductor.

18. A method of operation for a transferring power to a power receiver using an inductive power signal, the power transmitter comprising: a first inductor for providing via the first inductor an inductive power signal to the power receiver; a second inductor for receiving data signals from the power receiver, a capacitor in a series coupling with the second inductor; wherein the first and second inductors are separate inductors in a power transfer circuit and a data signal receiving circuit, the method comprising:
a data extracting circuit of the data signal receiving circuit extracting the data signals received by the second inductor;
a driver generating a drive signal for the series coupling of the second inductor and the capacitor during a drive time interval including the communication period,
a control unit controlling the power signal supplied via the first inductor to the power receiver in dependence on the data signals received; and
transferring power via the first inductor during power transfer periods of a repeating time frame and receive data signal via the second inductor during communication periods of a repeating time frame, a power of the inductive power signal being reduced for the communication period relative to the power transfer period;
applying a controlled electrical coupling of the data extraction circuit to the second inductor during a communication period and electrical decoupling of the data extraction circuit from the second inductor during at least a part of power transfer periods; and
a discharge circuit of the data signal receiving circuit discharging the capacitor during a discharge time interval of the time frame at least partially preceding the communication period.

* * * * *